(12) United States Patent
Yang et al.

(10) Patent No.: US 11,561,662 B2
(45) Date of Patent: Jan. 24, 2023

(54) INPUT-SENSING UNIT AND ELECTRONIC APPARATUS INCLUDING THE SAME

(71) Applicant: Samsung Display Co., Ltd., Yongin-si (KR)

(72) Inventors: Sung-Jin Yang, Cheonan-si (KR); Kicheol Kim, Yongin-si (KR); Hyunsik Park, Cheonan-si (KR); Chungi You, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/720,614

(22) Filed: Apr. 14, 2022

(65) Prior Publication Data

US 2022/0236834 A1 Jul. 28, 2022

Related U.S. Application Data

(63) Continuation of application No. 16/904,953, filed on Jun. 18, 2020, now Pat. No. 11,314,364.

(30) Foreign Application Priority Data

Jun. 20, 2019 (KR) .................. 10-2019-0073293

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01)

(58) Field of Classification Search
CPC combination set(s) only.
See application file for complete search history.

(56) References Cited

U.S. PATENT DOCUMENTS

| 9,046,975 | B2 | 6/2015 | Kang et al. |
| 2009/0085891 | A1 | 4/2009 | Yang et al. |
| 2009/0321148 | A1 | 12/2009 | Hsu et al. |

(Continued)

FOREIGN PATENT DOCUMENTS

| CN | 109032407 | 12/2018 |
| JP | 2017021631 | 1/2017 |

(Continued)

OTHER PUBLICATIONS

Extended European Search Report dated Nov. 13, 2020, in European Patent Application No. 20181212.0.

(Continued)

*Primary Examiner* — Deeprose Subedi
(74) *Attorney, Agent, or Firm* — H.C. Park & Associates, PLC

(57) ABSTRACT

An input-sensing unit includes first sensing electrodes, second sensing electrodes, first sensing lines, second sensing lines, third sensing lines, and bridge patterns. The second sensing electrodes are electrically insulated from the first sensing electrodes. The first sensing lines are respectively connected to the first sensing electrodes. The second sensing lines are respectively connected to first ends of the second sensing electrodes. The third sensing lines are respectively connected to second ends of the second sensing electrodes. The second ends oppose the first ends. The bridge patterns are respectively connected to the third sensing lines. The bridge patterns are closer to the first ends than to the second ends. The bridge patterns extend in a direction parallel to the third sensing lines.

19 Claims, 17 Drawing Sheets

(56) References Cited

U.S. PATENT DOCUMENTS

| | | |
|---|---|---|
| 2010/0085326 A1 | 4/2010 | Anno |
| 2011/0057893 A1 | 3/2011 | Kim et al. |
| 2013/0021296 A1 | 1/2013 | Min et al. |
| 2013/0106747 A1 | 5/2013 | Choi et al. |
| 2014/0116756 A1 | 5/2014 | Jiang et al. |
| 2015/0009427 A1* | 1/2015 | Chen .................. G06F 3/0446 349/12 |
| 2015/0220191 A1* | 8/2015 | Huh .................... G06F 3/0443 345/173 |
| 2016/0188114 A1 | 6/2016 | Kim et al. |
| 2017/0364194 A1 | 12/2017 | Jang et al. |
| 2018/0033831 A1 | 2/2018 | An et al. |
| 2018/0182822 A1 | 6/2018 | Seo et al. |
| 2019/0004624 A1 | 1/2019 | Zhu et al. |
| 2019/0073052 A1 | 3/2019 | Chen et al. |
| 2019/0146621 A1 | 5/2019 | Aoki et al. |
| 2020/0033997 A1 | 1/2020 | Wang et al. |

FOREIGN PATENT DOCUMENTS

| | | |
|---|---|---|
| KR | 10-1082293 | 11/2011 |
| KR | 10-2013-0126007 | 11/2013 |
| KR | 10-2016-0016391 | 2/2016 |
| KR | 10-2017-0142243 | 12/2017 |
| KR | 10-2018-0014384 | 2/2018 |
| KR | 10-2018-0075784 | 7/2018 |
| KR | 10-2018-0113960 | 10/2018 |
| KR | 10-2018-0129718 | 12/2018 |

OTHER PUBLICATIONS

Non-Final Office Action dated May 14, 2021, in U.S. Appl. No. 16/904,953.

Notice of Allowance dated Dec. 29, 2021, in U.S. Appl. No. 16/904,953.

\* cited by examiner

INPUT-SENSING UNIT AND ELECTRONIC APPARATUS INCLUDING THE SAME

CROSS-REFERENCE TO RELATED APPLICATION

This application is a Continuation of U.S. patent application Ser. No. 16/904,953, filed Jun. 18, 2020, which claims priority to and the benefit of Korean Patent Application No. 10-2019-0073293, filed Jun. 20, 2019, which is hereby incorporated by reference for all purposes as if fully set forth herein.

BACKGROUND

Field

Exemplary embodiments generally relate to an input-sensing unit and an electronic apparatus including the same, and more particularly, to an input-sensing unit with improved reliability and an electronic apparatus including the same.

Discussion

An electronic apparatus may be activated by an electrical signal. The electronic apparatus may include various electronic components, such as a display unit for displaying an image, an input-sensing unit for sensing an external input, etc. The electronic components can be electrically connected to each other through signal lines, which are variously arranged. In some instances, the electronic components are electrically connected to an external circuit through pads. As an integration density of the electronic components and the number of signal lines are increased, the number of the pads also increases. In addition, as the number of signal lines increases, it is may be necessary to develop a fine patterning process to form fine signal lines.

The above information disclosed in this section is only for understanding the background of the inventive concepts, and, therefore, may contain information that does not form prior art.

SUMMARY

Some aspects provide an input-sensing unit capable of increasing process reliability and electric reliability.

Some aspects provide an electronic apparatus including an input-sensing unit capable of increasing process reliability and electric reliability.

Additional aspects will be set forth in the detailed description which follows, and, in part, will be apparent from the disclosure, or may be learned by practice of the inventive concepts.

According to some aspects, an input-sensing unit includes first sensing electrodes, second sensing electrodes, first sensing lines, second sensing lines, third sensing lines, and bridge patterns. The second sensing electrodes are electrically insulated from the first sensing electrodes. The first sensing lines are respectively connected to the first sensing electrodes. The second sensing lines are respectively connected to first ends of the second sensing electrodes. The third sensing lines are respectively connected to second ends of the second sensing electrodes. The second ends oppose the first ends. The bridge patterns are respectively connected to the third sensing lines. The bridge patterns are closer to the first ends than to the second ends. The bridge patterns extend in a direction parallel to the third sensing lines.

According to some aspects, an electronic apparatus includes a display unit and an input-sensing unit. The display unit includes a base substrate, and pixels disposed on the base substrate. The input-sensing unit is disposed on the display unit. The input-sensing unit includes sensing electrodes, first sensing lines, second sensing lines, and bridge patterns. The first sensing lines are respectively connected to first ends of the sensing electrodes. The second sensing lines are respectively connected to second ends of the sensing electrodes. The second ends oppose the first ends. The bridge patterns cross at least some of the first sensing lines and are respectively connected to the second sensing lines. The bridge patterns are closer to the first ends than to the second ends. The bridge patterns are respectively disposed on the second sensing lines.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF SOME EXEMPLARY EMBODIMENTS

Figure 1A:
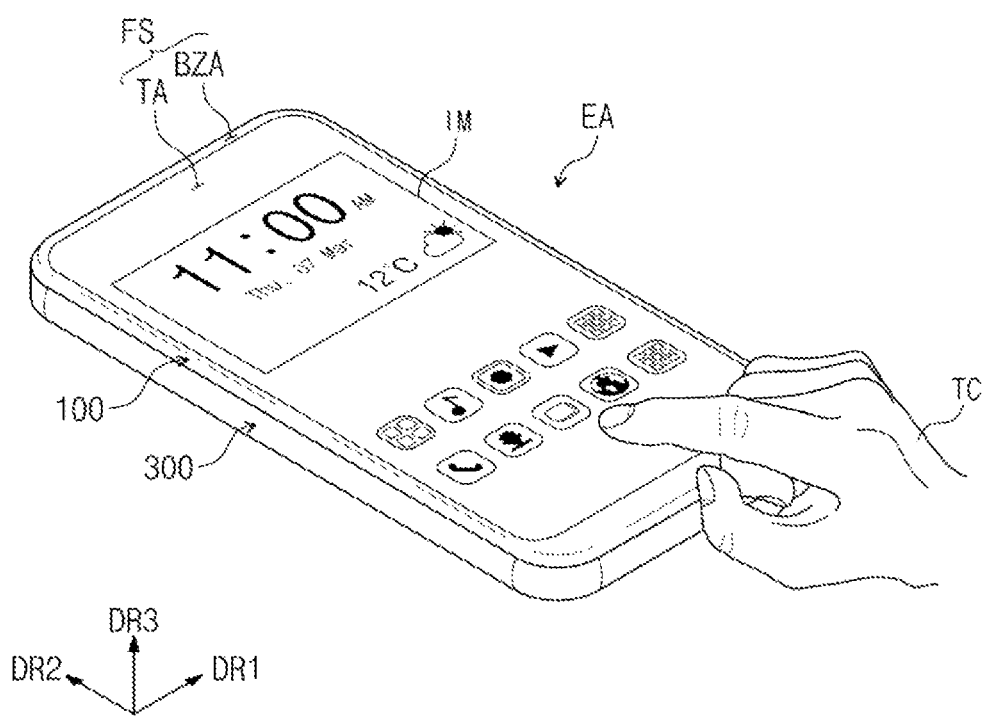
FIG. 1A is a perspective view illustrating an electronic apparatus according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Figure 1B:
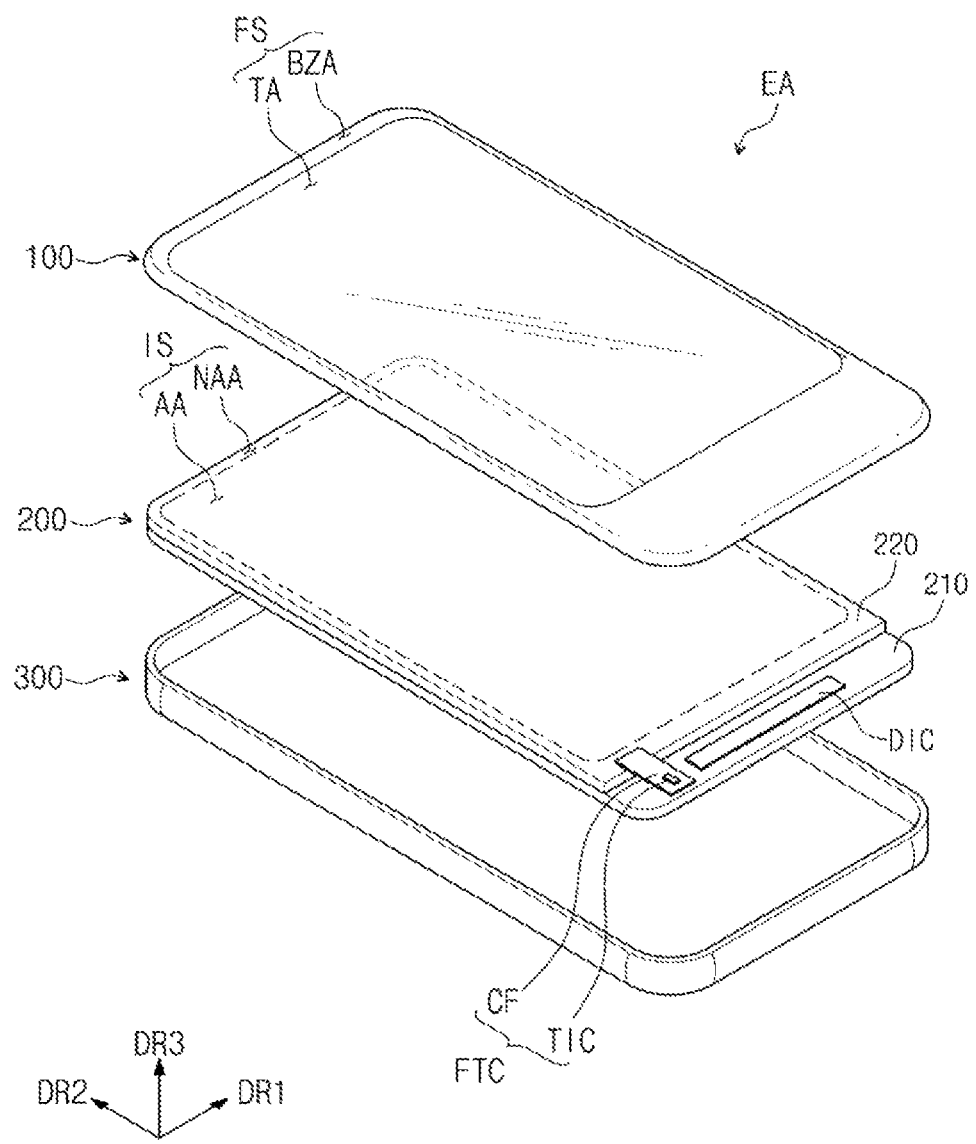
FIG. 1B is an exploded perspective view of the electronic apparatus shown in FIG. 1A according to some exemplary embodiments.

Hereinafter, various exemplary embodiments will be explained in detail with reference to the accompanying drawings FIG. 1A is a perspective view illustrating an electronic apparatus according to some exemplary embodiments. FIG. 1B is an exploded perspective view of the electronic apparatus shown in FIG. 1A according to some exemplary embodiments. Hereinafter, some embodiments will be described with reference to FIGS. 1A and 1B.

An electronic apparatus EA may be selectively activated by an electrical signal applied thereto. The electronic apparatus EA may be implemented in various forms. For example, the electronic apparatus EA may be one of tablets, laptop computers, computers, smart televisions, etc. For descriptive convenience, the electronic apparatus EA will be described as a smart phone, such as illustrated in FIG. 1A.

The electronic apparatus EA may include a display surface FS, which is parallel to each of a first direction DR1 and a second direction DR2, and is used to display an image IM in a third direction DR3. The display surface FS, on which the image IM is displayed, may correspond to a front or top surface of the electronic apparatus EA and may correspond to a front surface FS of a window 100. Hereinafter, the display surface (e.g., the front surface) FS of the electronic apparatus EA and the front surface FS of the window 100 may be indicated using the same reference character. The image IM may be a video image and/or a still image. As shown in FIG. 1A, a clock icon and a plurality of application icons may be displayed as parts of the image IM, but embodiments are not limited thereto.

According to some exemplary embodiments, a front or top surface and a rear or bottom surface of each element may be defined based on the display direction of the image IM. For instance, the front surface and the rear surface may be opposite to each other in the third direction DR3, and a direction normal to each of the front and rear surfaces may be parallel to the third direction DR3. A distance between the front and rear surfaces in the third direction DR3 may correspond to a thickness of an electronic panel 200, e.g., a display panel, in the third direction DR3. Directions indicated by the first to third directions DR1, DR2, and DR3 may be relative concept, and in some embodiments, may be changed to indicate other directions.

The electronic apparatus EA according to some exemplary embodiments may sense a user's input TC provided from the outside. The user's input TC may include various types of external inputs, such as a part of a user's body, light, heat, and/or pressure. The user's input TC is exemplarily illustrated to be an input to the front surface FS through a user's hand; however, embodiments are not limited to this example. The user's input TC may be provided in various forms such as described above. In addition, the electronic apparatus EA may sense the user's input TC, which is applied through at least one of a side and rear surface of the electronic apparatus EA, depending on a structure of the electronic apparatus EA, but embodiments are not limited to this example or a specific embodiment.

The electronic apparatus EA may further include an electronic panel 200 and an outer case 300, in addition to the window 100. In some embodiments, the window 100 and the outer case 300 may be combined to each other to form an outer appearance of the electronic apparatus EA.

The window 100 may include an insulating panel. For example, the window 100 may be formed of or include at least one of glass, plastic, and combinations thereof.

The front surface FS of the window 100 may define the front surface of the electronic apparatus EA, as described above. The front surface FS of the window 100 may include a transmission region TA and a bezel region BZA. The transmission region TA may be an optically transparent region. For example, the transmission region TA may be a region with transmittance to visible light being about 90% or higher.

The bezel region BZA may have relatively low optical transmittance as compared with the transmission region TA. The bezel region BZA may define the shape of the transmission region TA. The bezel region BZA may be adjacent to the transmission region TA and, in some embodiments, may enclose the transmission region TA.

The bezel region BZA may have a predetermined color. The bezel region BZA may cover a peripheral region NAA of the electronic panel 200 and may prevent the peripheral region NAA from being recognized by a user. However, embodiments are not limited to this example, and in some exemplary embodiments, the bezel region BZA may be omitted from the window 100.

The electronic panel 200 may display the image IM and sense the user's input TC. The image IM may be displayed on a front surface IS of the electronic panel 200. The front surface IS of the electronic panel 200 may include an active region AA and the peripheral region NAA. The active region AA may be a region that is selectively activated by an electrical signal.

In some embodiments, the active region AA may be a region used to display the image IM and to sense the user's input TC. The transmission region TA may be overlapped with at least a portion of the active region AA. For example, the transmission region TA may be overlapped with a front surface of the active region AA or with at least a portion of the front surface of the active region AA. Thus, a user may recognize the image IM through the transmission region TA or may provide the user's input TC through the transmission region TA. However, embodiments are not limited to this example or a specific embodiment, and in some exemplary embodiments, the active region AA may be divided into a region for displaying the image IM and another region for sensing the user's input TC.

The peripheral region NAA may be a region covered with the bezel region BZA. The peripheral region NAA may be adjacent to the active region AA. The peripheral region NAA may enclose the active region AA. A driving circuit or a driving line, which is used to drive the active region AA, may be disposed in the peripheral region NAA.

The electronic panel 200 may include a display unit 210, an input-sensing unit 220, a display driving circuit DIC, and a sensing circuit substrate FTC.

The display unit 210 may be an element that substantially produces the image IM. The image IM, which is produced by the display unit 210, may be displayed on the display surface FS through the transmission region TA and may be recognized by a user.

The input-sensing unit 220 may sense the user's input TC applied from an outside of the electronic apparatus EA. As described above, the input-sensing unit 220 may sense the user's input TC provided to the window 100.

The display driving circuit DIC may be disposed in the display unit 210. The display driving circuit DIC may be mounted on the display unit 210. The display driving circuit DIC may be electrically connected to the display unit 210 and may provide electrical signals, which are used to drive the display unit 210, to the display unit 210.

The sensing circuit substrate FTC may be electrically connected to the input-sensing unit 220. In some embodiments, the sensing circuit substrate FTC may include a flexible circuit board CF and a sensing driver circuit TIC. The flexible circuit board CF may include lines. The lines may electrically connect the input-sensing unit 220 to the sensing driver circuit TIC. The sensing driver circuit TIC may be mounted on the flexible circuit board CF (e.g., in the form of a chip-on film). The input-sensing unit 220 may receive electrical signals, which are independently provided from the display unit 210 through the sensing circuit substrate FTC.

The outer case 300 may be combined with the window 100 to define an outer appearance of the electronic apparatus EA. The outer case 300 may provide an internal space. The electronic panel 200 may be contained in the internal space, which is provided by the outer case 300.

The outer case 300 may be formed of or include a material having a relatively high hardness. For example, the outer case 300 may include at least one of glass, plastic, and metallic materials or may include a plurality of frames and/or plates that are made of at least one of the glass, plastic, and metallic materials. The outer case 300 may stably protect components of the electronic apparatus EA, which are contained in the internal space, from an external impact.

Figure 2A:
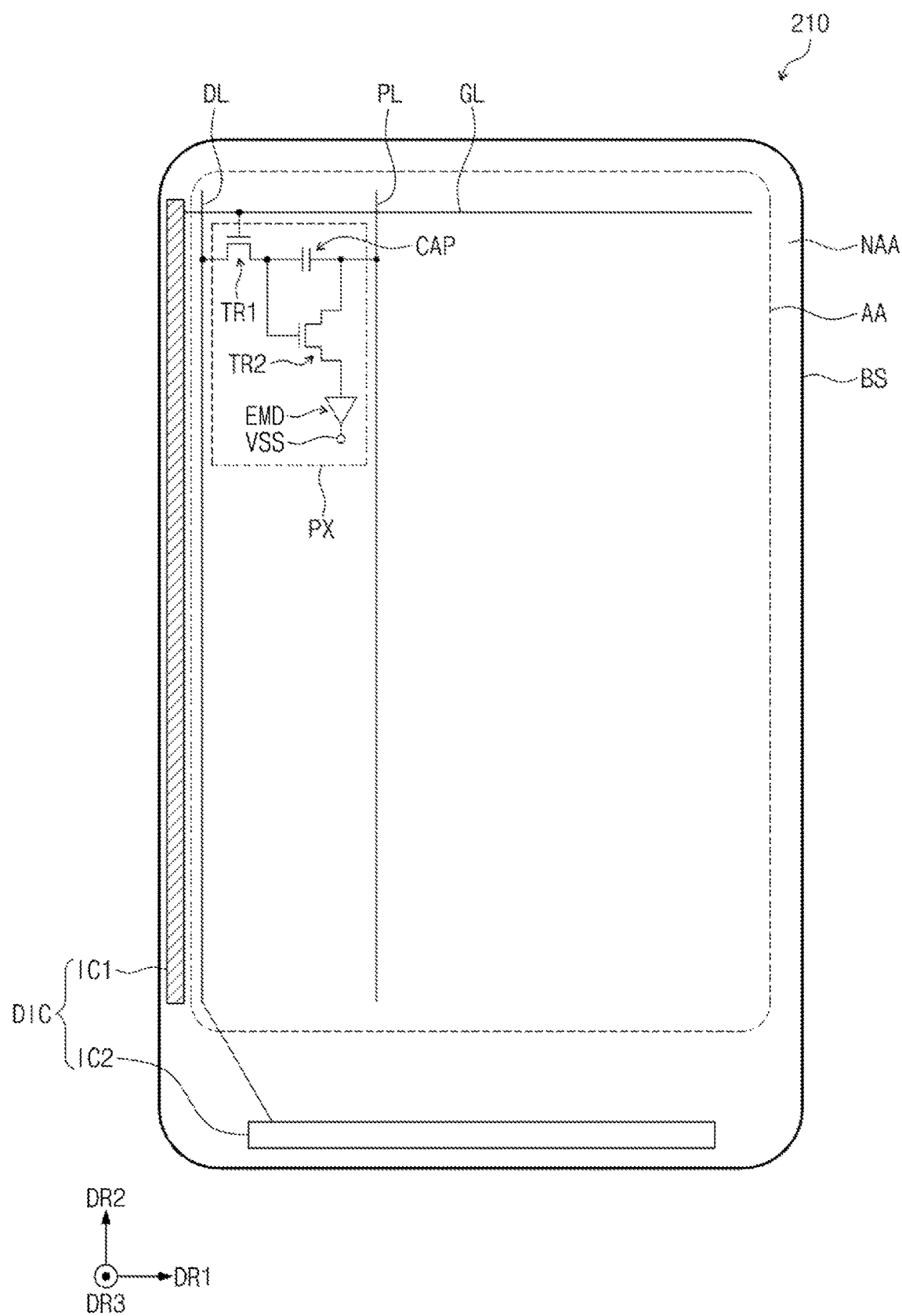
FIG. 2A is a plan view illustrating a display unit according to some exemplary embodiments.
Figure 2B:
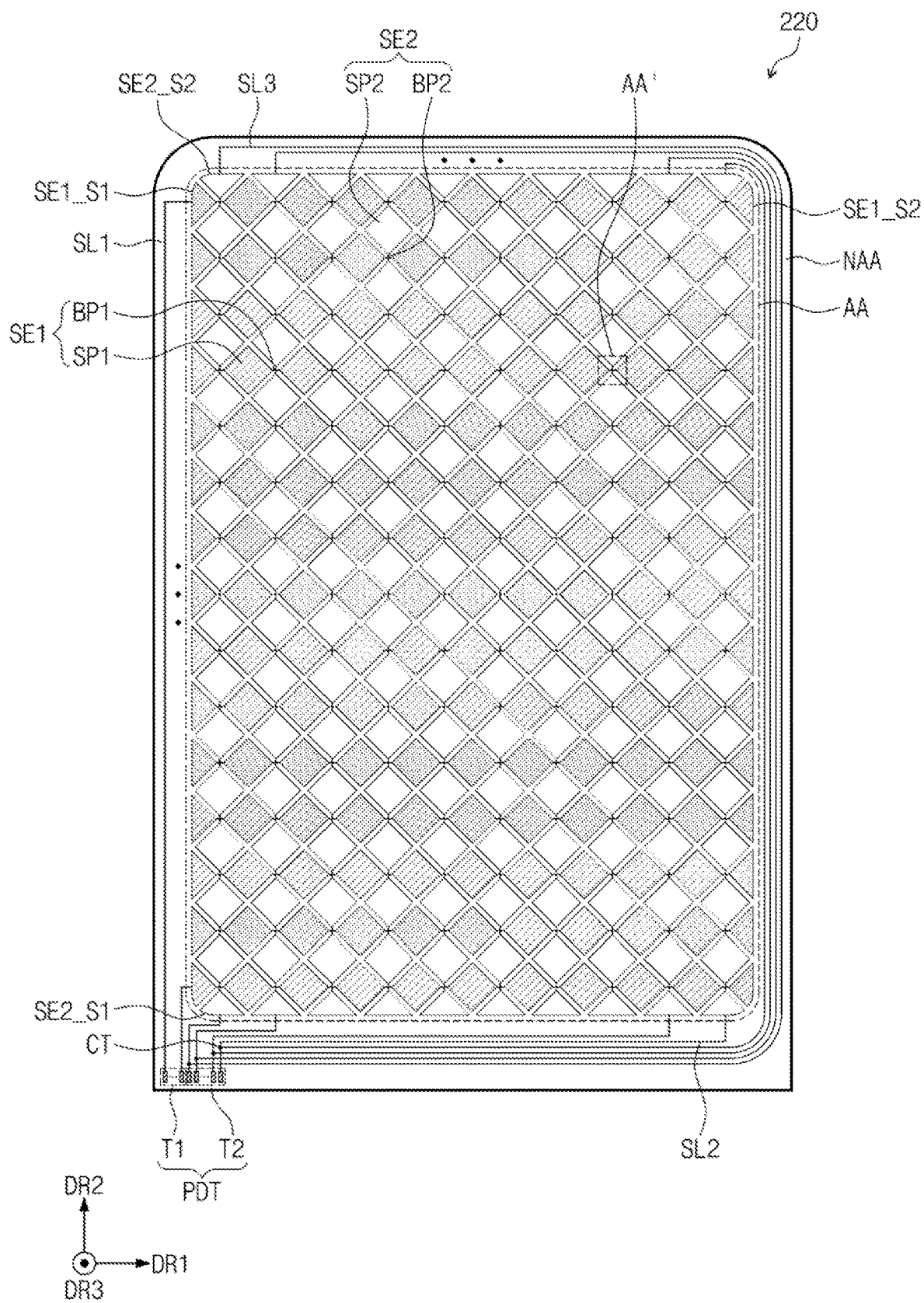
FIG. 2B is a plan view illustrating an input-sensing unit according to some exemplary embodiments.

FIG. 2A is a plan view illustrating a display unit according to some exemplary embodiments. FIG. 2B is a plan view illustrating an input sensing unit according to some exemplary embodiments. For convenience in illustration, some elements are omitted from FIGS. 2A and 2B. Hereinafter, a some exemplary embodiments will be described with reference to FIGS. 2A and 2B.

Some elements (e.g., a base substrate BS, a plurality of pixels PX, and a plurality of signal lines GL, DL, and PL) constituting the display unit 210, and the display driving circuit DIC are illustrated in FIG. 2A. The display driving circuit DIC may include a gate driving circuit IC1 and a data driving circuit IC2.

The active region AA and the peripheral region NAA may be defined in (or on) the base substrate BS. The base substrate BS may include an insulating substrate. For example, the base substrate BS may include at least one of a glass substrate, a plastic substrate, and combinations thereof.

The signal lines GL, DL, and PL may be connected to the pixels PX and may be used to deliver electrical signals to the pixels PX. The signal lines GL, DL, and PL in the display unit 210 may include a gate line GL, a data line DL, and a power line PL, as exemplarily shown in FIG. 2A. However, embodiments are not limited to this example or a specific embodiment, and in some exemplary embodiments, the signal lines GL, DL, and PL may further include at least one of a power line, an initialization voltage line, and an emission control line.

In an embodiment, a plurality of the gate lines GL may be provided, and each of the gate lines GL may be connected to the gate driving circuit IC1. The gate driving circuit IC1 may sequentially provide gate signals to corresponding ones of the gate lines GL. Each of the pixels PX may be turned on or off by the gate signal applied thereto.

The data line DL may be provided to cross the gate line GL and may be electrically insulated from the gate line GL. In an embodiment, a plurality of the data lines DL may be provided, and each of the data lines DL may be connected to the data driving circuit IC2. The data driving circuit IC2 may provide data signals to corresponding ones of the data lines DL. The pixels PX may display light(s) corresponding to the data signals.

Each of the pixels PX may display light in the active region AA. In some embodiments, an example circuit diagram of one of the pixels PX is illustrated in an enlarged manner. The pixel PX may include a first thin film transistor TR1, a capacitor CAP, a second thin film transistor TR2, and an emission element EMD. The first thin film transistor TR1 may be a switching device used to control the on/off operation of the pixel PX. The first thin film transistor TR1 may transmit or block a data signal transmitted through the data line DL in response to a scan signal transmitted through the gate line GL.

The capacitor CAP may be connected to the first thin film transistor TR1 and the power line PL. The capacitor CAP may be used to store electric charge, and an amount of the electric charge stored in the capacitor CAP may be determined by a voltage difference between the data signal transmitted from the first thin film transistor TR1 and a first power signal applied to the power line PL.

The second thin film transistor TR2 may be connected to the first thin film transistor TR1, the capacitor CAP, and the emission element EMD. The second thin film transistor TR2 may control a driving current flowing through the emission element EMD based on an amount of charge stored in the capacitor CAP. A turn-on time of the second thin film transistor TR2 may be determined depending on the amount of charge stored in the capacitor CAP. During the turn-on time of the second thin film transistor TR2, the second thin film transistor TR2 may provide the first power signal, which is transferred through the power line PL, to the emission element EMD.

The emission element EMD may generate light or control an amount of light according to an electrical signal. For example, the emission element EMD may include an organic light emitting device, a quantum dot light emitting device, a micro light emitting device, a nano light emitting device, an electrophoretic device, or an electrowetting device, but exemplary embodiments are not limited thereto.

The emission element EMD may be connected to a power terminal VSS and may receive a power signal (hereinafter, a second power signal), which is different from the first power signal provided through the power line PL. A difference in voltage between the electrical signal provided from the second thin film transistor TR2 and the second power signal may determine an amount of the driving current flowing through the emission element EMD, and in this case, an intensity of the light generated by the emission element EMD may be determined by the amount of the driving current. However, embodiments are not limited to this example or a specific embodiment, and in some exemplary embodiments, the pixel PX may include electronic devices provided in various structures or arrangements.

The input-sensing unit 220 may be disposed on the display unit 210. The input-sensing unit 220 may sense the user's input TC and may obtain information on the position and strength of the user's input TC. The input-sensing unit 220 may include a plurality of sensing electrodes SE1 and SE2, a plurality of sensing lines SL1, SL2 and SL3, and a plurality of sensing pads PDT.

The sensing electrodes SE1 and SE2 may be disposed in the active region AA. The sensing electrodes SE1 and SE2 may include a plurality of first sensing electrodes SE1 and a plurality of second sensing electrodes SE2 that receive different electrical signals from each other. The input-sensing unit 220 may obtain information on the user's input TC, which is provided to the active region AA, from a change in capacitance between the first sensing electrodes SE1 and the second sensing electrodes SE2. However, embodiments are not limited to this example, and in some exemplary embodiments, the input-sensing unit 220 may obtain information on the user's input TC, which is provided to the active region AA, from a change in resistance between the first and second sensing electrodes SE1 and SE2 or a change resistance or capacitance of each of the sensing electrodes SE1 and SE2. Furthermore, the input-sensing unit 220 may be operated in various manners, and embodiments are not limited to a specific operation method of the input-sensing unit 220.

The first sensing electrodes SE1 may be arranged to be spaced apart from each other in the second direction DR2 and may extend in the first direction DR1. Each of the first sensing electrodes SE1 may include a plurality of first sensing patterns SP1 and a plurality of first connection patterns BP1, which are arranged in the first direction DR1.

The first sensing patterns SP1 and the first connection patterns BP1 may be alternately arranged in the first direction DR1. Each of the first connection patterns BP1 may connect two adjacent patterns of the first sensing patterns SP1. For convenience in illustration, the first sensing patterns SP1 are depicted as shaded patterns.

The second sensing electrodes SE2 may be arranged to be spaced apart from each other in the first direction DR1 and may extend in the second direction DR2. The second sensing electrodes SE2 may include a plurality of second sensing patterns SP2 and a plurality of second connection patterns BP2, which are arranged in the second direction DR2. The second sensing patterns SP2 and the second connection patterns BP2 may be alternately arranged in the second direction DR2. Each of the second connection patterns BP2 may connect two adjacent patterns of the second sensing patterns SP2.

In some embodiments, the first connection patterns BP1 and the second connection patterns BP2 may be disposed on different layers, and the first sensing patterns SP1 and the second sensing patterns SP2 may be disposed on the same layer. For example, the first connection patterns BP1 may be disposed on a layer different from a layer on which the second connection patterns BP2, the first sensing patterns SP1, and the second sensing patterns SP2 are disposed, and the second connection patterns BP2, the first sensing patterns SP1, and the second sensing patterns SP2 may be disposed on the same layer.

However, embodiments are not limited to this example or a specific embodiment. For example, in some exemplary embodiments, the first connection patterns BP1 may be disposed on the same layer as a layer on which the first sensing patterns SP1 and the second sensing patterns SP2 are disposed, and in another exemplary embodiment, the first sensing electrodes SE1 and the second sensing electrodes SE2 may be disposed on different layers.

The sensing lines SL1, SL2 and SL3 and the sensing pads PDT may be disposed in the peripheral region NAA. The sensing pads PDT may be connected to the sensing lines SL1, SL2 and SL3 respectively. The sensing lines SL1, SL2 and SL3 may include a plurality of first sensing lines SL1, a plurality of second sensing lines SL2 and a plurality of third sensing lines SL3. The first sensing lines SL1 and the second sensing lines SL2 may be disposed on a same layer as the third sensing lines SL3.

The first sensing lines SL1 may be respectively connected to first ends SE1_S1 of the first sensing electrodes SE1 that oppose second ends SE1_S2 of the first sensing electrodes SE1. The first sensing lines SL1 may connect first pads T1 of the sensing pads PDT to the first sensing electrodes SE1, respectively, and may deliver electrical signals, which are provided from the outside, to the first sensing electrodes SE1.

The second sensing lines SL2 may be respectively connected to first ends SE2_S1 of the second sensing electrodes SE2. The first ends SE2_S1 of the second sensing electrodes SE2 may be portions of the second sensing electrodes SE2 that are located relatively close to the sensing pads PDT. The second sensing lines SL2 may connect second pads T2 of the sensing pads PDT to the second sensing electrodes SE2, respectively, and may deliver electrical signals, which are provided from the outside, to the second sensing electrodes SE2.

The third sensing lines SL3 may be respectively connected to opposite second ends SE2_S2 of the second sensing electrodes SE2. The second ends SE2_S2 of the second sensing electrodes SE2 may be portions of the second sensing electrodes SE2 that are opposite to the first ends SE2_S1 of the second sensing electrodes SE2.

In an embodiment, the second sensing electrodes SE2 may be connected to the second sensing lines SL2 and the third sensing lines SL3. For instance, when the second sensing electrodes SE2 are longer than the first sensing electrodes SE1, both of ends SE2_S1 and SE2_S2 of the second sensing electrodes SE2 are connected to the second and third sensing lines SL2 and SL3 respectively. Therefore, it may be possible to prevent sensitivity of the second sensing electrode SE2 from being varied according to the position.

The third sensing lines SL3 may be coupled to the second sensing lines SL2, respectively. The input-sensing unit 220 may include a plurality of coupling portions CT. The third sensing lines SL3 may be electrically connected to corresponding ones of the second sensing lines SL2 through the coupling portions CT. Thus, the third sensing lines SL3 may transmit substantially the same electrical signal as that transmitted by a corresponding one of the second sensing lines SL2.

The input-sensing unit 220 may provide electrical signals to the second sensing lines SL2 and the third sensing lines SL3 through the second pads T2. According to some exemplary embodiments, the input-sensing unit 220 may be provided to realize substantially uniform sensitivity throughout the front surface of the active region AA without increasing an area of the sensing pads PDT.

Figure 3A:
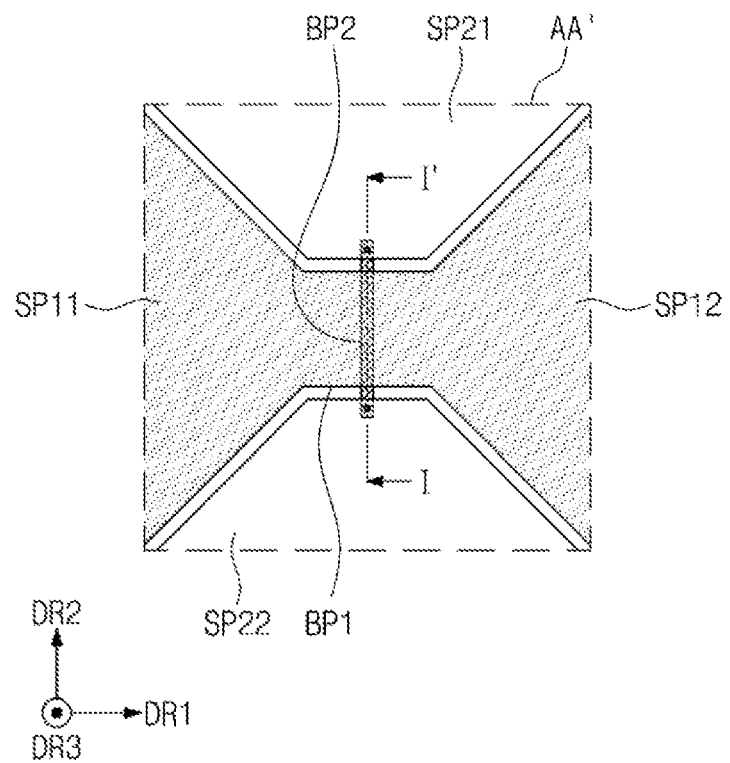
FIG. 3A is a plan view illustrating a portion of an input-sensing unit according to some exemplary embodiments.
Figure 3B:
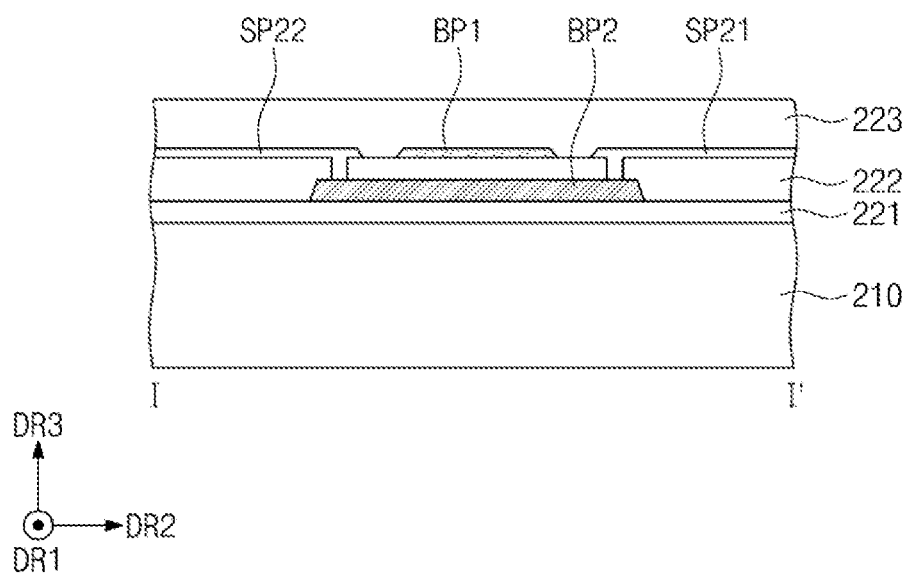
FIG. 3B is a sectional view taken along sectional line I-I' of FIG. 3A according to some exemplary embodiments.
Figure 4A:
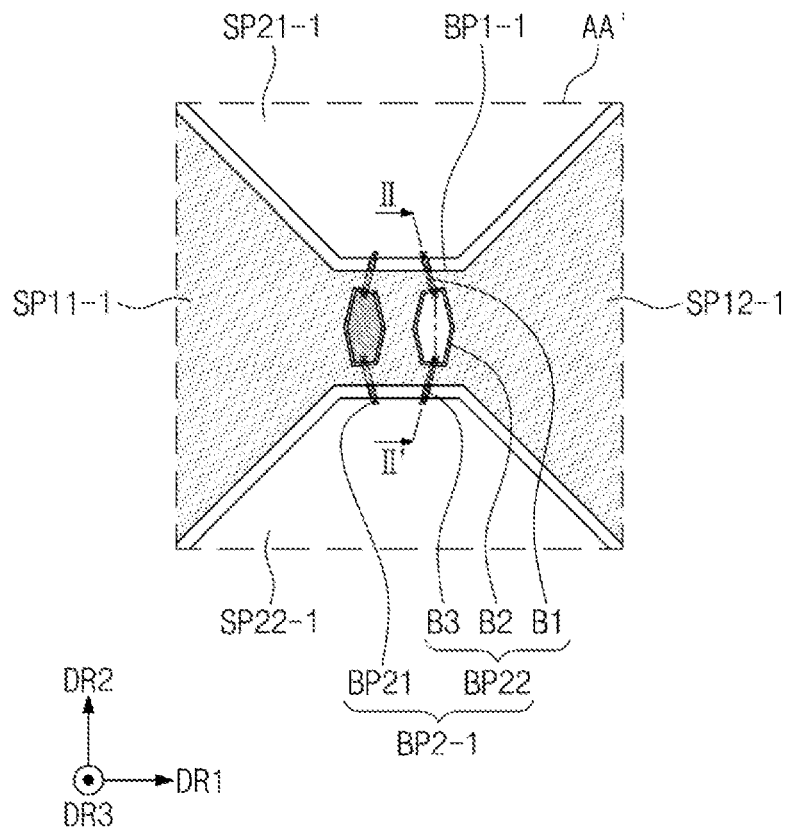
FIG. 4A is a plan view illustrating a portion of an input-sensing unit according to some exemplary embodiments.
Figure 4B:
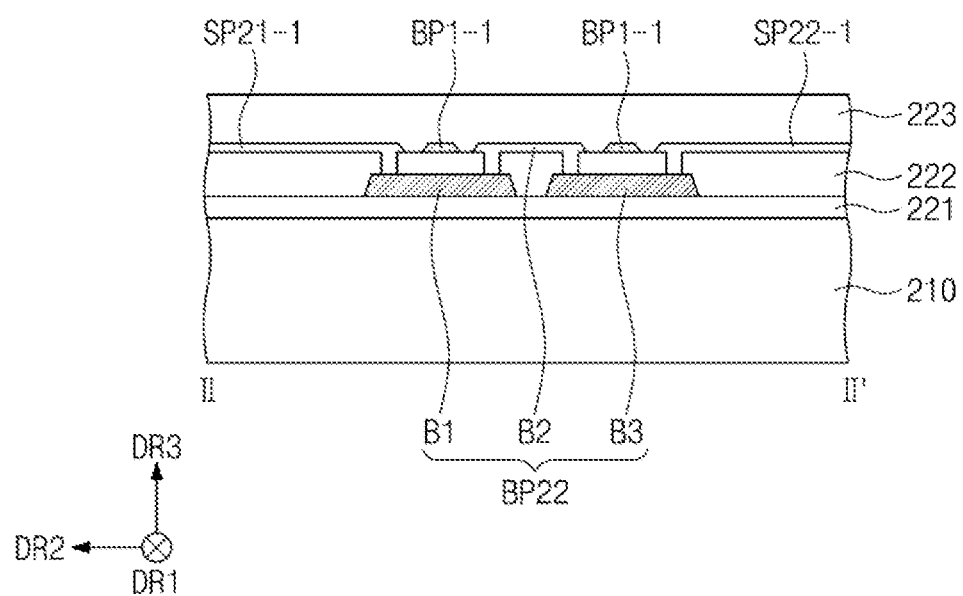
FIG. 4B is a sectional view taken along sectional line II-IP of FIG. 4A according to some exemplary embodiments.

FIG. 3A is a plan view illustrating a portion of an input-sensing unit according to some exemplary embodiments. FIG. 3B is a sectional view taken along sectional line I-I' of FIG. 3A according to some exemplary embodiments. FIG. 4A is a plan view illustrating a portion of an input-sensing unit according to some exemplary embodiments. FIG. 4B is a sectional view taken along sectional line II-IP of FIG. 4A according to some exemplary embodiments.

FIG. 3A illustrates a region AN of FIG. 2B, and FIG. 4A illustrates a region corresponding to FIG. 3A. Hereinafter, some exemplary embodiments will be described with reference to FIGS. 3A, 3B, 4A, and 4B. For concise description, an element previously described with reference to FIGS. 1A to 2B may be identified by the same (or similar) reference number without repeating an overlapping description thereof.

As shown in FIG. 3A, the region AA' may be a region in which the first connection pattern BP1 and the second connection pattern BP2 cross each other. For convenience in illustration, two patterns (e.g., SP11 and SP12) of the first sensing patterns SP1 (refer to FIG. 2B) connected to the first connection pattern BP1 and two patterns (e.g., SP21 and SP22) of the second sensing patterns SP2 (refer to FIG. 2B) connected to the second connection pattern BP2 are exemplarily illustrated in FIG. 3A.

Referring to FIGS. 3A and 3B, the first connection pattern BP1 and the second connection pattern BP2 may cross each other when viewed in a plan view. The first connection pattern BP1 and the second connection pattern BP2 may be disposed on different layers. In some embodiments, the first connection pattern BP1 may be disposed between a second sensing insulating layer 222 and a third sensing insulating layer 223, and the second connection pattern BP2 may be disposed between a first sensing insulating layer 221 and the second sensing insulating layer 222.

The first sensing patterns SP11 and SP12 may be spaced apart from the second sensing patterns SP21 and SP22, when viewed in a plan view. The first sensing patterns SP11 and SP12 and the second sensing patterns SP21 and SP22 may be disposed on the same layer. The first sensing patterns SP11 and SP12 may be electrically insulated from the second sensing patterns SP21 and SP22. In some embodiments, the first sensing patterns SP11 and SP12 and the first connection pattern BP1 are integrally formed each other.

The first sensing patterns SP11 and SP12 and the second sensing patterns SP21 and SP22 may be disposed on the same level as a layer on which the first connection pattern BP1 is disposed or on the same layer. The second sensing patterns SP21 and SP22 may penetrate the second sensing insulating layer 222 and may be coupled to the second connection pattern BP2.

In some embodiments, the first connection pattern BP1 and the second connection pattern BP2 may be formed of or include different materials. In some embodiments, the first connection pattern BP1 may be optically transparent, and the second connection pattern BP2 may be optically opaque. For example, the first connection pattern BP1 may be formed of or include transparent conductive oxide (TCO), and the second connection pattern BP2 may be formed of or include at least one of metals and conductive polymers.

However, embodiments are not limited to this example, and in some exemplary embodiments, the first connection pattern BP1 may be optically opaque and the second connection pattern BP2 may be optically transparent. Alternatively, both of the first and second connection patterns BP1 and BP2 may be optically transparent or optically opaque, or the first and second connection patterns BP1 and BP2 may be formed of or include the same material. The structure and materials of the input-sensing unit 220 may be variously changed, and embodiments not limited to a specific embodiment.

As shown in FIGS. 4A and 4B, a second connection pattern BP2-1 may include a plurality of second connection patterns BP21 and BP22, which are spaced apart from each other. Second sensing patterns SP21-1 and SP22-1 may be connected to each other through the second connection patterns BP21 and BP22. Accordingly, even when one of the second connection patterns BP21 and BP22 is damaged, it may be possible to stably maintain the electric connection between the second sensing patterns SP21-1 and SP22-1.

Each of the second connection patterns BP21 and BP22 may include a first portion B1, a second portion B2, and a third portion B3. The first portion B1 may connect one (e.g., second sensing pattern SP21-1) of the second sensing patterns SP21-1 and SP22-1 to the second portion B2, and the third portion B3 may connect the other (e.g., second sensing pattern SP22-1) of the second sensing patterns SP21-1 and SP22-1 to the second portion B2.

The second portion B2 and a first connection pattern BP1-1 may be disposed on the same layer. The second portion B2 may be spaced apart from the first connection pattern BP1-1 when viewed in a plan view or a cross-sectional view. The second portion B2 may be electrically insulated from the first connection pattern BP1-1.

In the input-sensing unit 220 according to some exemplary embodiments, the structures of the first sensing patterns SP11, SP12, SP11-1, and SP12-1 and the second sensing patterns SP21, SP22, SP21-1, and SP22-1 may be variously changed, as long as the first sensing patterns SP11, SP12, SP11-1, and SP12-1 are electrically insulated from the second sensing patterns SP21, SP22, SP21-1, and SP22-1, and embodiments are not limited to a specific embodiment.

Figure 5:
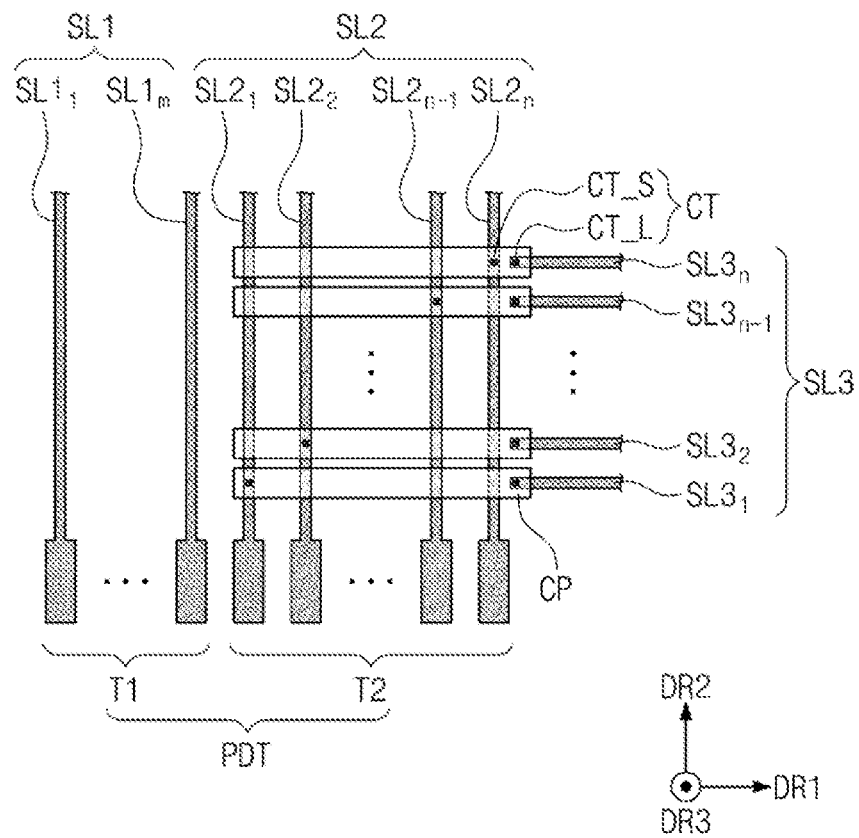
FIG. 5 is a plan view illustrating a portion of an input-sensing unit according to some exemplary embodiments.

FIG. 5 is a plan view illustrating a portion of an input-sensing unit according to some exemplary embodiments. For instance, a region in which the coupling portions CT electrically connecting the third sensing lines SL3 to the second sensing lines SL2 are defined is illustrated in FIG. 5. Hereinafter, some exemplary embodiments will be described with reference to FIG. 5.

The first sensing lines SL1 may include m first sensing lines $SL1_1$ to $SL1_m$, such as shown in FIG. 5. The $1^{st}$ to m-th first sensing lines $SL1_1$ to $SL1_m$ may be disposed in a region adjacent to the coupling portions CT and may be sequentially arranged in the first direction DR1. The first sensing lines SL1 may be connected to the first pads T1, respectively. The first sensing lines SL1 may independently deliver respective electrical signals through the first pads T1.

The second sensing lines SL2 may include n second sensing lines $SL2_1$, $SL2_2$, ..., $SL2_{n-1}$, and $SL2_n$, such as shown in FIG. 5. The 1st to n-th line $SL2_1$ to $SL2_n$ of the second sensing line SL2 may be disposed in a region adjacent to the coupling portions CT and may be sequentially arranged in the first direction DR1. The second sensing lines SL2 may be connected to the second pads T2, respectively. The second sensing lines SL2 may independently deliver respective electrical signals through the second pads T2.

The third sensing lines SL3 may be provided in the same number as the second sensing lines SL2. For instance, the third sensing lines SL3 may include n third sensing lines $SL3_1$, $SL3_2$, ..., $SL3_{n-1}$, and $SL3_n$, such as shown in FIG. 5. The 1st to n-th lines $SL3_1$ to $SL3_n$ of the third sensing lines SL3 may extend in the first direction DR1 in a region adjacent to the coupling portions CT and may be sequentially arranged in the second direction DR2.

The third sensing lines SL3 may be connected to the second sensing lines SL2. The third sensing lines SL3 may be connected to the second sensing lines SL2 in a one-to-one manner. The third sensing lines SL3 may deliver the same electrical signals as those delivered by the second sensing lines SL2.

The third sensing lines SL3 may be connected to the second sensing lines SL2 through a plurality of bridge patterns CP. The bridge patterns CP may be arranged in the second direction DR2 and may extend in the first direction DR1. The bridge patterns CP may be provided to cross the second sensing lines SL2 and may be electrically insulated from the second sensing lines SL2 apart from the coupling portions CT. The bridge patterns CP may be overlapped with the second sensing lines SL2 when viewed in a plan view.

In some embodiments, the bridge patterns CP are illustrated to have a length, which is overlapped with n second sensing lines SL2 and to have the same shape. However, embodiments are not limited to this example, and in some embodiments, the bridge patterns CP may be provided to have different shapes from each other, and embodiments are not limited to a specific embodiment.

In some embodiments, the first to third sensing lines SL1 to SL3 may include at least one of metals and conductive polymers. Also, each of the bridge patterns CP may comprise transparent conductive oxide.

The bridge patterns CP may be provided in the same number as the third sensing lines SL3. In some embodiments, the second sensing lines SL2 and the third sensing lines SL3 may be spaced apart from each other and may not be overlapped with each other when viewed in a plan view. The bridge patterns CP may electrically connect the second sensing lines SL2 to the third sensing lines SL3 which are spaced apart from the second sensing lines SL2.

The bridge patterns CP may connect the third sensing lines SL3 to the second sensing lines SL2 in a one-to-one manner. Each of the third sensing lines SL3 may be connected to a corresponding one of the second sensing lines SL2 through a corresponding one of the bridge patterns CP.

Each of the bridge patterns CP may be coupled to a corresponding one of the second sensing lines SL2 and a corresponding one of the third sensing lines SL3 through the coupling portion CT. The coupling portion CT may include a first coupling portion CT_S and a second coupling portion CT_L. The first coupling portion CT_S may electrically connect the bridge patterns CP to the second sensing lines SL2. The second coupling portion CT_L may electrically connect the bridge patterns CP to the third sensing lines SL3.

A first line $SL3_1$ of the third sensing lines SL3 may be coupled to a first line $SL2_1$ of the second sensing lines SL2 through one bridge pattern CP. A second line $SL3_2$ of the third sensing lines SL3 may be coupled to a second line $SL2_2$ of the second sensing lines SL2 through one bridge pattern CP. Similarly, each of an (n−1)-th line $SL3_{n-1}$ of the third sensing lines SL3 and an n-th line $SL3_n$ of the third sensing lines SL3 may be coupled to a corresponding one of an (n−1)-th line $SL2_{n-1}$ of the second sensing lines SL2 and an n-th line $SL2_n$ of the second sensing lines SL2 through one bridge pattern CP.

In an embodiment, the third sensing lines SL3 may be connected to the second sensing lines $SL2_n$ instead of additional pads, and may independently deliver respective electrical signals. Accordingly, it may be possible to provide electrical signals to the first ends SE2_S1 and second ends SE2_S2 (refer to FIG. 2B) of the second sensing electrodes SE2 (refer to FIG. 2B) through only the second pads T2 (refer to FIG. 2B), without adding pads to provide electrical signals to the third sensing lines SL3.

Figure 6:
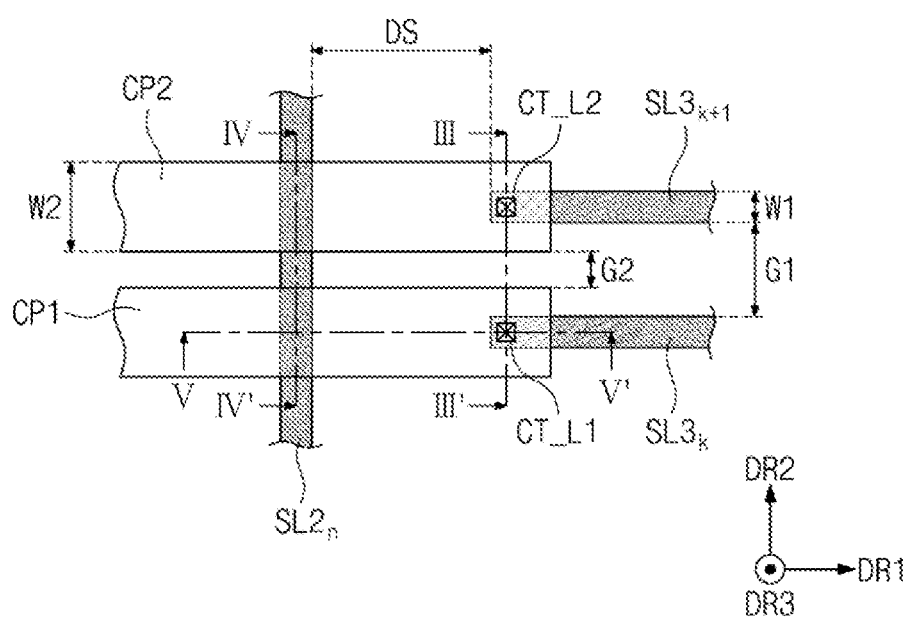
FIG. 6 is a plan view illustrating a portion of an input-sensing unit according to some exemplary embodiments.
Figure 7A:
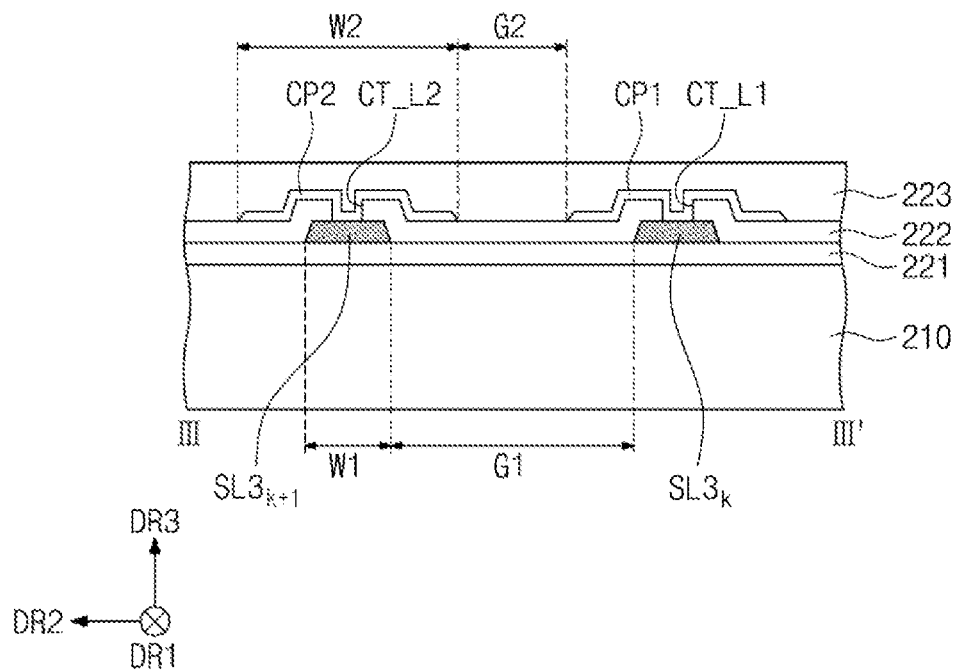
FIG. 7A is a sectional view taken along sectional line of FIG. 6 according to some exemplary embodiments.
Figure 7B:
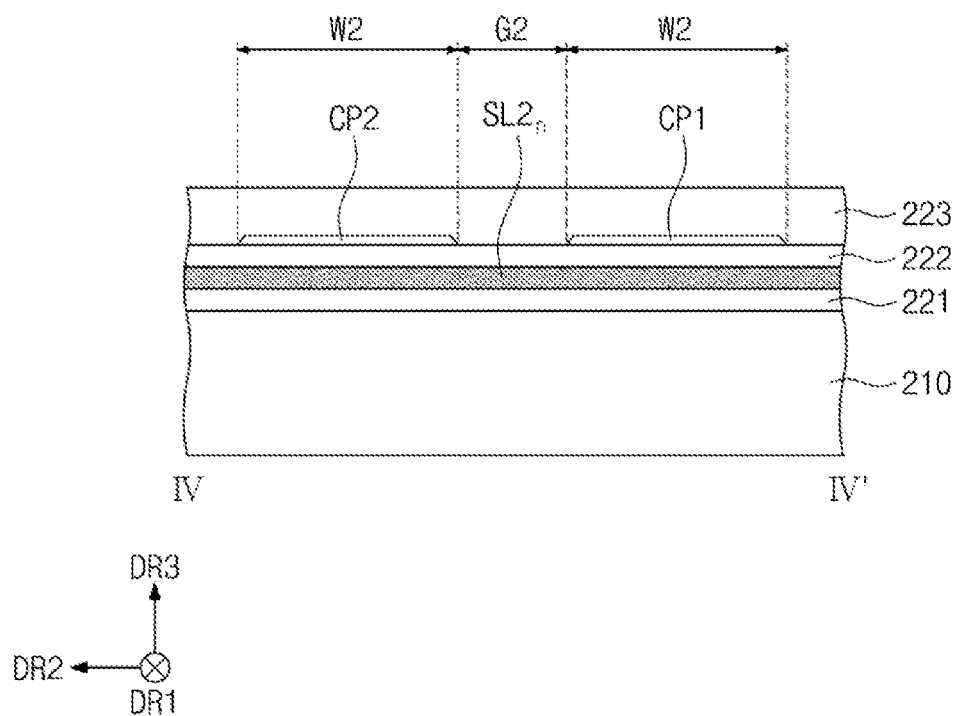
FIG. 7B is a sectional view taken along sectional line IV-IV' of FIG. 6 according to some exemplary embodiments.
Figure 7C:
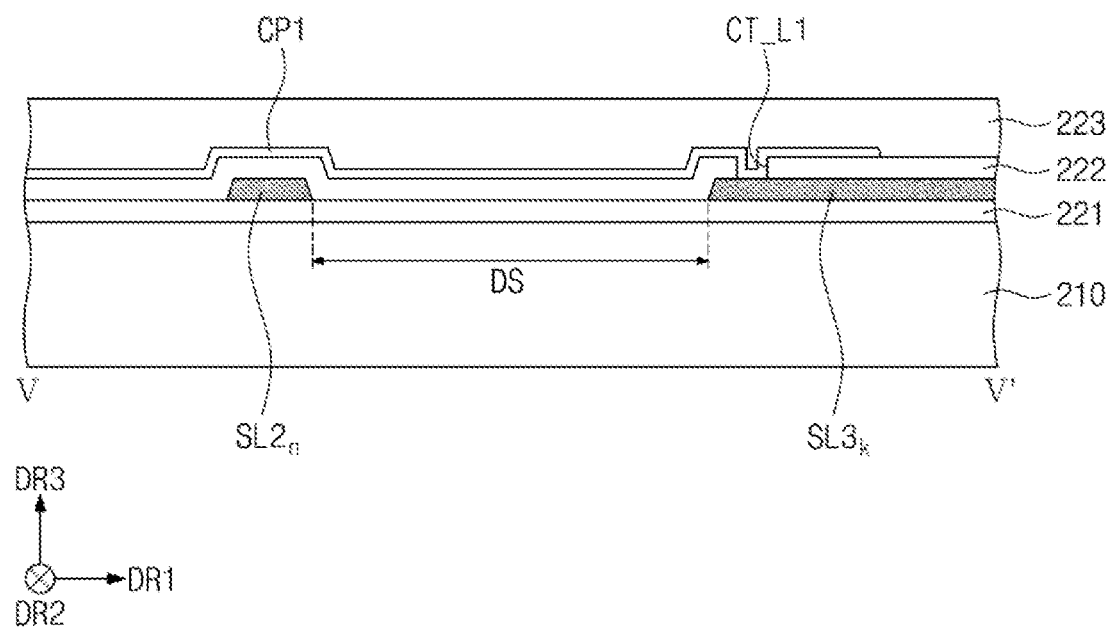
FIG. 7C is a sectional view taken along sectional line V-V' of FIG. 6 according to some exemplary embodiments.

FIG. 6 is a plan view illustrating a portion of an input-sensing unit according to some exemplary embodiments. FIG. 7A is a sectional view taken along sectional line III-III' of FIG. 6 according to some exemplary embodiments. FIG. 7B is a sectional view taken along sectional line IV-IV' of FIG. 6 according to some exemplary embodiments. FIG. 7C is a sectional view taken along sectional line V-V' of FIG. 6 according to some exemplary embodiments. For convenience in description, FIG. 6 shows an enlarged shape of only some elements shown in FIG. 5. Hereinafter, some exemplary embodiments will be described with reference to FIGS. 6 to 7C. For concise description, an element previously described with reference to FIGS. 1A to 5 may be identified by the same (or similar) reference number without repeating an overlapping description thereof.

Referring to FIG. 6, third sensing lines $SL3_k$ and $SL3_{k+1}$ (where k<n) may be disposed to be spaced apart from the n-th line $SL2_n$ of the second sensing lines SL2, which is the closest one of the second sensing lines SL2 (see, e.g., FIG. 5), by a distance DS. The distance DS may be the minimum distance in the first direction DR1 between end portions of the third sensing lines $SL3_k$ and $SL3_{k+1}$ and the n-th line $SL2_n$ of the second sensing lines SL2.

The third sensing lines $SL3_k$ and $SL3_{k+1}$ may be spaced apart from each other by a first gap G1 and each of them may have a first width W1. The first gap G1 and the first width W1 may be values defined in the second direction DR2. In some embodiments, the third sensing lines $SL3_k$ and $SL3_{k+1}$ are illustrated to have the same width (e.g., the first width W1), but embodiments are not limited to this example or a specific embodiment. For example, in some embodiments, the third sensing lines $SL3_k$ and $SL3_{k+1}$ may be provided to have different widths.

Bridge patterns CP1 and CP2, which are respectively connected to the third sensing lines $SL3_k$ and $SL3_{k+1}$, may extend parallel to the third sensing lines $SL3_k$ and $SL3_{k+1}$. The third sensing lines $SL3_k$ and $SL3_{k+1}$ may be respectively connected to the bridge patterns CP1 and CP2 through second coupling portions CT_L1 and CT_L2.

The n-th line $SL2_n$ of the second sensing lines SL2 may extend to cross the bridge patterns CP1 and CP2. The bridge patterns CP1 and CP2 may be spaced apart from each other by a second gap G2 and each of them may have a second width W2. The second gap G2 and the second width W2 may be values defined in the second direction DR2. Although the bridge patterns CP1 and CP2 are illustrated to have the second width W2, embodiments are not limited to this example or a specific embodiment. For example, the bridge patterns CP1 and CP2 may be provided to have different widths.

Referring to FIG. 7A, the third sensing lines $SL3_k$ and $SL3_{k+1}$ may be disposed between the first sensing insulating layer 221 and the second sensing insulating layer 222, and the bridge patterns CP1 and CP2 may be disposed between the second sensing insulating layer 222 and the third sensing insulating layer 223. As such, in some embodiments, the bridge patterns CP1 and CP2 may be disposed at a level (or layer) different from the third sensing lines $SL3_k$ and $SL3_{k+1}$ and may be disposed on the third sensing lines $SL3_k$ and $SL3_k1$.

The first width W1 may be within a range of feature sizes that can be achieved by a process of patterning the third sensing lines $SL3_k$ and $SL3_{k+1}$. Since each of the third sensing lines $SL3_k$ and $SL3_{k+1}$ is provided to have at least the first width W1, it may be possible to prevent the third sensing lines $SL3_k$ and $SL3_{k+1}$ from being incompletely patterned by the patterning process. In some embodiments, the first width W1 may be greater than or equal to, for example, about 4 µm.

The first gap G1 may be within a range of feature sizes that can be achieved by the patterning process of the third sensing lines $SL3_k$ and $SL3_{k+1}$. In some embodiments, the first gap G1 may be greater than or equal to, for example, about 7 µm.

The bridge patterns CP1 and CP2 may penetrate the second sensing insulating layer 222 and may be coupled to the third sensing lines $SL3_k$ and $SL3_{k+1}$, respectively. Each of the second coupling portions CT_L1 and CT_L2 may be defined to penetrate the second sensing insulating layer 222.

The second width W2 may be greater than or equal to the first width W1. For example, the second width W2 may be greater than or equal to about 4 µm. Since each of the bridge patterns CP1 and CP2 is provided to have at least the second width W2, it may provide an area for defining the second coupling portions CT_L1 and CT_L2.

The second gap G2 may be within a range of feature sizes that can be distinguished by an optical inspection system used for an optical inspection process on the bridge patterns CP1 and CP2. For example, in some embodiments, the second gap G2 may be greater than or equal to about 3 µm.

In some embodiments, the bridge patterns CP1 and CP2 may be designed to be spaced apart from each other by the second gap G2. Thus, even when there is a patterning failure (e.g., a reverse-tapered shape) of the third sensing lines $SL3_k$ and $SL3_{k+1}$, it may be possible to prevent a disconnection failure from occurring in the bridge patterns CP1 and CP2. Thus, even when the third sensing lines $SL3_k$ and $SL3_{k+1}$ are formed to have a fine width of, for example, about 4 µm, it may be possible to stably maintain the electrical connections between the second sensing lines SL2 and the third sensing lines SL3. Accordingly, the reliability of the input-sensing unit 220 may be improved.

Referring to FIG. 7B, in a region overlapping the n-th line $SL2_n$ of the second sensing lines SL2 the bridge patterns CP1 and CP2 may have a flat shape without unevenness, but embodiments are not limited thereto. Accordingly, it may be possible to prevent the bridge patterns CP1 and CP2 from being cut by the n-th line $SL2_n$ of the second sensing line SL2 disposed below the bridge patterns CP1 and CP2.

Referring to FIG. 7C, the bridge pattern CP1 may cross the n-th line $SL2_n$ of the second sensing lines SL2 and may be coupled to the third sensing line $SL3_k$. The distance DS between the n-th line $SL2_n$ of the second sensing lines SL2 and the third sensing lines $SL3_k$ and $SL3_{k+1}$ may be limited within a range in which sectional shapes of the second and third sensing lines SL2 and SL3 can be easily controlled during the patterning process of the second and third sensing lines SL2 and SL3. For example, the distance DS between the n-th line $SL2_n$ of the second sensing lines SL2 and the third sensing lines $SL3_k$ or $SL3_{k+1}$ may be greater than or equal to about 10 µm.

In an embodiment, each of the bridge patterns CP1 and CP2 may be a single-continuous pattern that does not have any disconnected parts in a region between the n-th line $SL2_n$ of the second sensing lines SL2 and the third sensing lines $SL3_k$ and $SL3_{k+1}$. For instance, since the distance DS between the n-th line $SL2_n$ of the second sensing lines SL2 and the third sensing lines $SL3_k$ or $SL3_{k+1}$ may be greater than or equal to about 10 µm, it may be possible to prevent a patterning failure (e.g., a reverse-tapered shape) from occurring in the n-th line $SL2_n$ of the second sensing lines SL2 and the third sensing lines $SL3_k$ and $SL3_{k+1}$. Accordingly, it may be possible to prevent a disconnection failure from occurring in the bridge patterns CP1 and CP2.

According to some exemplary embodiments, since the second sensing lines SL2 are connected to the third sensing lines SL3 through the bridge patterns CP extending parallel to the third sensing lines SL3 it may be possible to easily prevent disconnection failures or the like from occurring in the bridge patterns CP due to a patterning failure in the third sensing lines SL3. Accordingly, the second and third sensing lines SL2 and SL3 may be easily designed to have an increased integration density. In addition, the second sensing lines SL2 the third sensing lines SL3 and the bridge patterns CP may be designed in such a way that distances therebetween or widths thereof are within predetermined ranges, and this may make it possible to easily secure the reliability of the input-sensing unit 220.

Figure 8A:
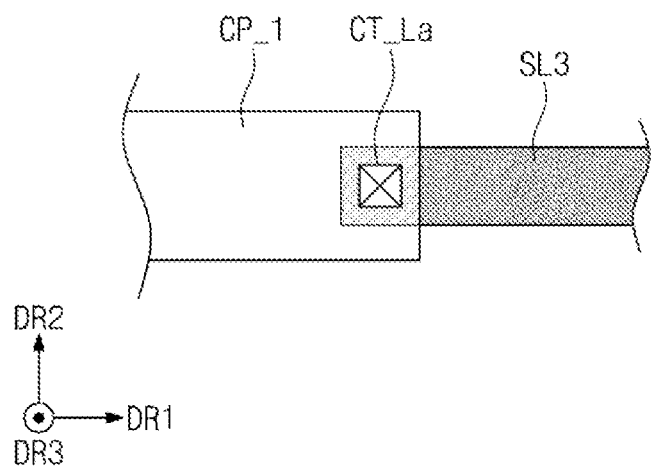
FIG. 8A is a plan view illustrating a portion of an input-sensing unit according to some exemplary embodiments.
Figure 8B:
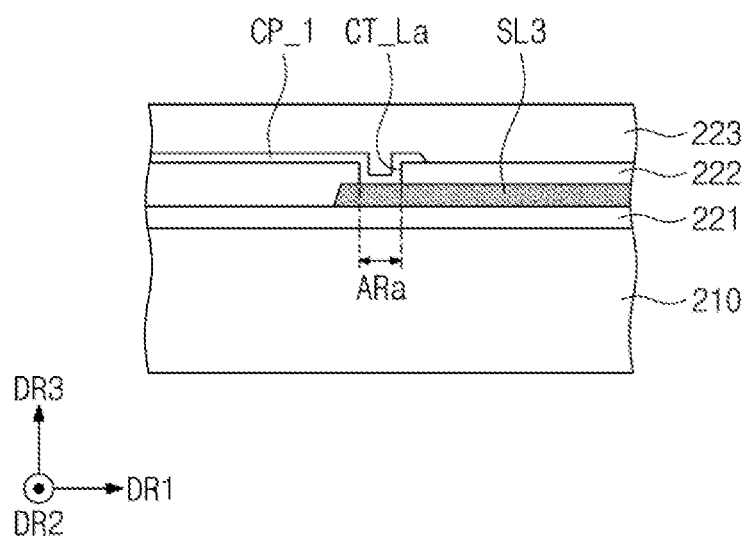
FIG. 8B is a sectional view of the structure shown in FIG. 8A according to some exemplary embodiments.
Figure 9A:
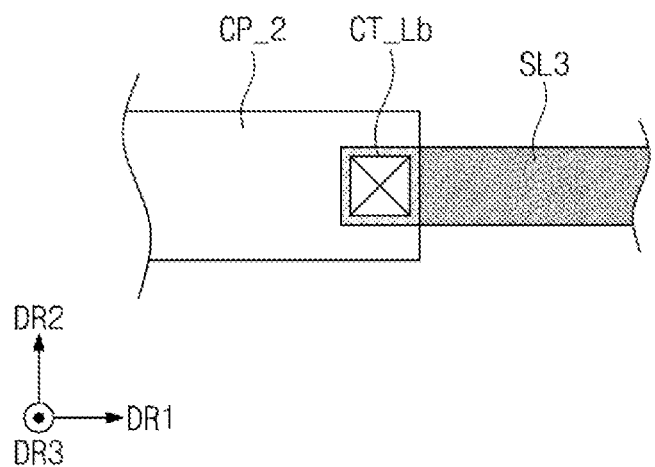
FIG. 9A is a plan view illustrating a portion of an input-sensing unit according to some exemplary embodiments.
Figure 9B:
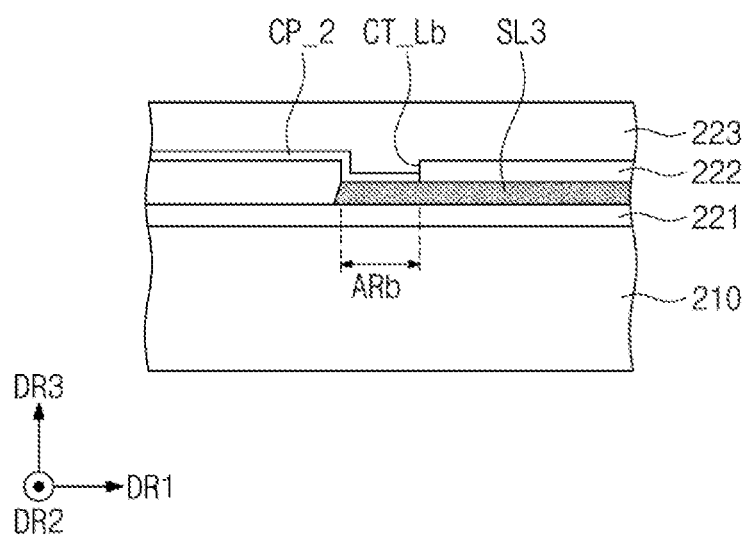
FIG. 9B is a sectional view of the structure shown in FIG. 9A according to some exemplary embodiments.

FIG. 8A is a plan view illustrating a portion of an input-sensing unit according to some exemplary embodiments. FIG. 8B is a sectional view of the structure shown in FIG. 8A according to some exemplary embodiments. FIG. 9A is a plan view illustrating a portion of an input-sensing unit according to some exemplary embodiments. FIG. 9B is a sectional view of the structure shown in FIG. 9A according to some exemplary embodiments. Hereinafter, some exemplary embodiments will be described with reference to FIGS. 8A to 9B. For concise description, an element previously described with reference to FIGS. 1A to 7C may be identified by the same (or similar) reference number without repeating an overlapping description thereof.

As shown in FIGS. 8A and 8B, one bridge pattern CP_1 may be connected to one third sensing line SL3 through one second coupling portion CT_La. Here, an area ARa of the coupling portion CT_La may be smaller than an overlapping area between the third sensing line SL3 and the bridge pattern CP_1.

In addition, as shown in FIGS. 9A and 9B, an area ARb of a coupling portion CT_Lb may be larger than the area ARa of the coupling portion CT_La shown in FIG. 8B. Here, the bridge pattern CP_2 and the third sensing line SL3 may be maintained to the same sizes.

In an embodiment, as the area ARb of the second coupling portion CT_Lb increases, the contacting area between the bridge pattern CP_2 and the third sensing line SL3 may be increased, and thereby, a contact resistance between the bridge pattern CP_2 and the third sensing line SL3 may be decreased. Accordingly, it may be possible to easily prevent a voltage drop issue that may be caused by the coupling issue between the bridge pattern CP_2 and the third sensing line SL3.

Figure 10A:
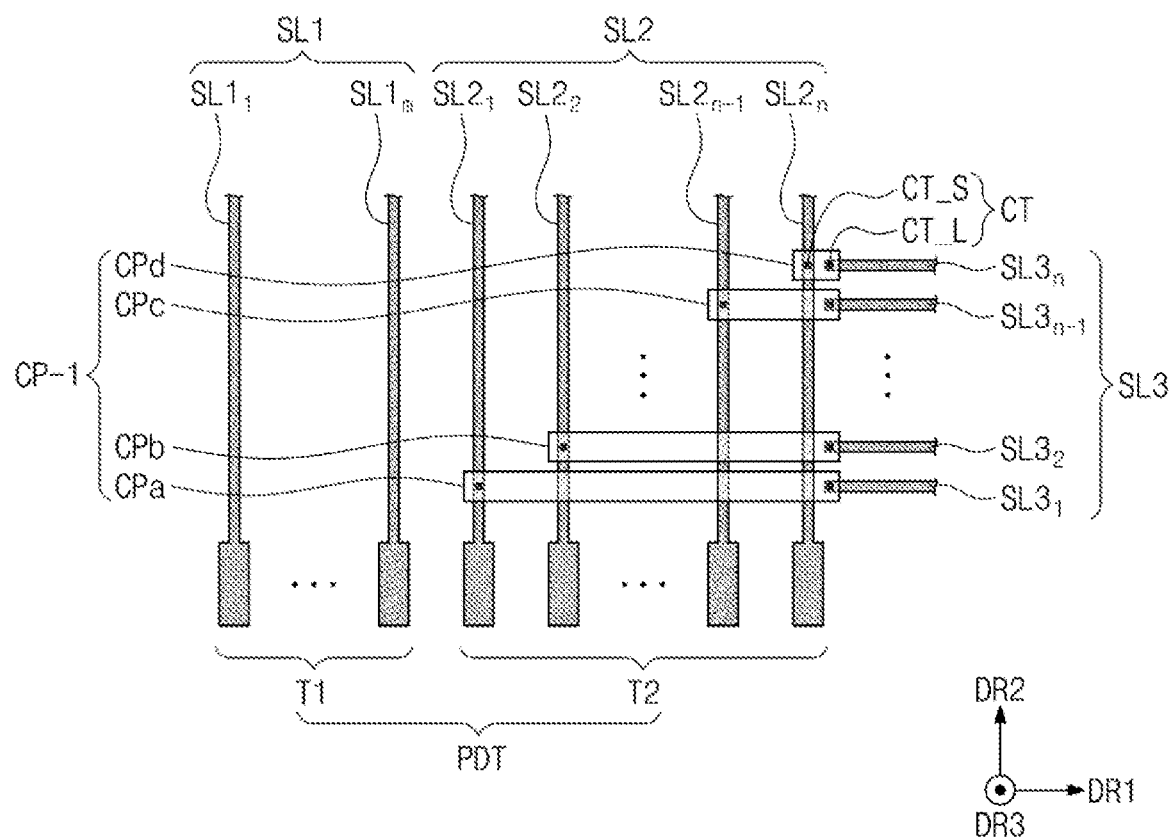
FIGS. 10A and 10B are plan views illustrating portions of input-sensing units according to various exemplary embodiments.
Figure 10B:
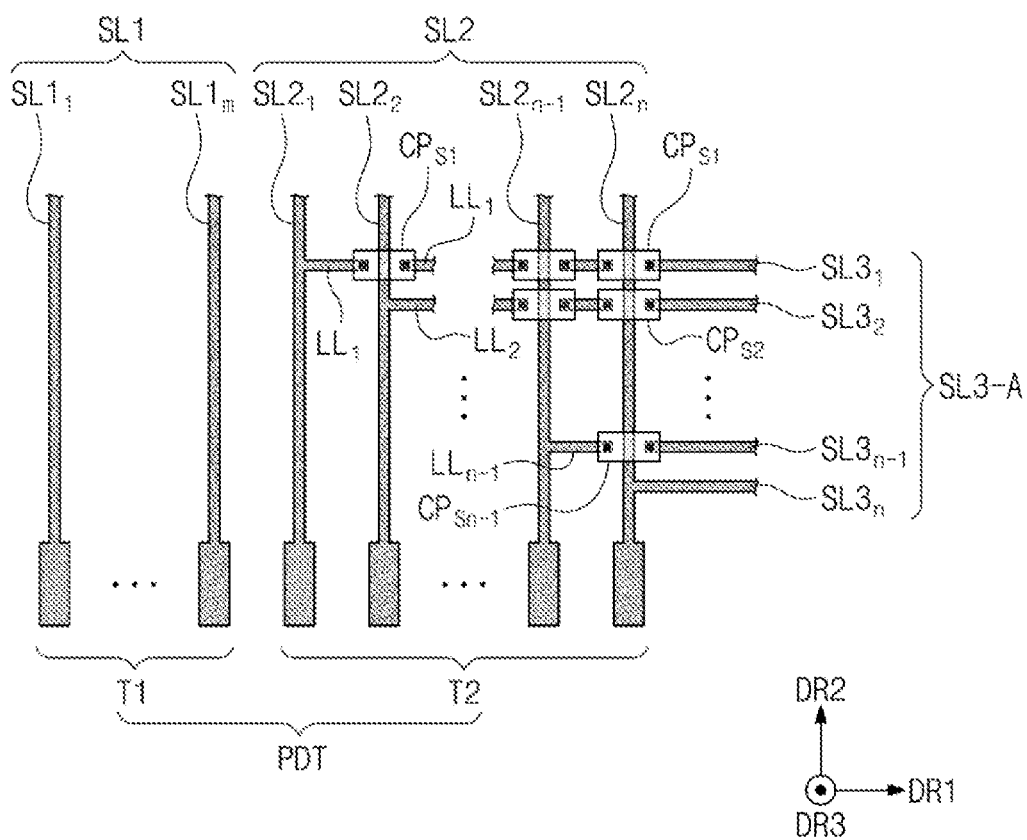

FIGS. 10A and 10B are plan views illustrating portions of input-sensing units according to various exemplary embodiments. For convenience in description, FIGS. 10A and 10B illustrate regions corresponding to the region shown in FIG. 5. Hereinafter, some exemplary embodiments will be described with reference to FIGS. 10A and 10B. For concise description, an element previously described with reference to FIGS. 1A to 9B may be identified by the same (or similar) reference number without repeating an overlapping description thereof.

As shown in FIG. 10A, a plurality of bridge patterns CP-1 may include bridge patterns CPa, CPb, CPc, and CPd whose shapes (or sizes) are different from each other. For convenience in illustration, four bridge patterns CPa, CPb, CPc, and CPd, which correspond to four second sensing lines $SL2_1$, $SL2_2$, $SL2_{n-1}$, and $SL2_n$ and four third sensing lines $SL3_1$, $SL3_2$, $SL3_{n-n}$, and $SL3_n$, are shown.

Each of the bridge patterns CPa, CPb, CPc, and CPd may extend along a opposite direction of the first direction DR1 to be overlapped with a corresponding one of the second sensing lines SL2 on which the corresponding coupling portion CT is defined. For instance, the bridge patterns CPa, CPb, CPc, and CPd may have extension lengths different from each other, and the number of the second sensing lines SL2 overlapped with the bridge patterns CPa, CPb, CPc, and CPd in a plan view may be different from each other.

For example, the bridge pattern CPa connecting the first line $SL2_1$ of the second sensing lines SL2 to the first line $SL3_1$ of the third sensing lines SL3 may extend to be overlapped with all of the second sensing lines SL2. For instance, the bridge pattern CPa connecting the first line $SL2_1$ of the second sensing lines SL2 to the first line $SL3_1$ of the third sensing lines SL3 may be overlapped with n second sensing lines $SL2_1$, $SL2_2$, ..., $SL2_{n-1}$, and $SL2_n$.

The bridge pattern CPb connecting the second line $SL2_2$ of the second sensing lines SL2 to the second line $SL3_2$ of the third sensing lines SL3 may extend to be overlapped with the second line $SL2_2$ of the second sensing lines SL2 but may not be overlapped with the first line $SL2_1$ of the second sensing lines SL2 when viewed in a plan view. The bridge pattern CPb connecting the second line $SL2_2$ of the second sensing lines SL2 to the second line $SL3_2$ of the third sensing lines SL3 may be overlapped with (n−1) second sensing lines $SL2_2$, $SL2_{n-1}$, and $SL2_n$ when viewed in a plan view.

The bridge pattern CPc connecting the (n−1)-th line $SL2_{n-1}$ of the second sensing lines SL2 to the (n−1)-th line $SL3_{n-1}$ of the third sensing lines SL3 may extend to be overlapped with the (n−1)-th line $SL2_{n-1}$ of the second sensing lines SL2. As such, the bridge pattern CPc connecting the (n−1)-th line $SL2_{n-1}$ of the second sensing lines SL2 to the (n−1)-th line $SL3_{n-1}$ of the third sensing lines SL3 may be overlapped with only the (n−1)-th line $SL2_{n-1}$ of the second sensing lines SL2 and the n-th line $SL2_n$ of the second sensing lines SL2. The bridge pattern CPc connecting the (n−1)-th line $SL2_{n-1}$ of the second sensing lines SL2 to the (n−1)-th line $SL3_{n-1}$ of the third sensing lines SL3 may be overlapped with two second sensing lines $SL2_{n-1}$ and $SL2_n$ when viewed in a plan view.

The bridge pattern CPd connecting the n-th line $SL2_n$ of the second sensing lines SL2 to the n-th line $SL3_n$ of the third sensing lines SL3 may extend to be overlapped with only the n-th line $SL2_n$ of the second sensing lines SL2. The bridge pattern CPd connecting the n-th line $SL2_n$ of the second sensing lines SL2 to the n-th line $SL3_n$ of the third sensing lines SL3 may not be overlapped with the others of the second sensing lines SL2 except for the n-th line $SL2_n$ of the second sensing lines SL2 when viewed in a plan view. The bridge pattern CPd connecting the n-th line $SL2_n$ of the second sensing lines SL2 to the n-th line $SL3_n$ of the third sensing lines SL3 may be overlapped with one second sensing line $SL2_n$ when viewed in a plan view. In some embodiments, it may be possible to reduce a total overlapping area between the bridge patterns CP-1 and the second sensing lines SL2 as compared with the bridge patterns CP of FIG. 5. Thus, it may be possible to reduce a parasitic capacitance between the second sensing lines SL2 and the bridge patterns CP-1, and thereby, improve the electric reliability of the input-sensing unit 220.

In an embodiment, such as shown in FIG. 10B, a plurality of bridge patterns $CP_{S1}$ to $CPS_{n-1}$ may be provided to be arranged in the second direction DR2. For example, the bridge patterns $CP_{S1}$ to $CPS_{n-1}$ may include sub-patterns $CP_{S1}$ to $CPS_{n-1}$ constituting a plurality of rows, which are extended in the first direction DR1 and are arranged in the second direction DR2. In some embodiments, third sensing lines SL3-A may be arranged in a reverse order from that of the third sensing lines SL3 shown in FIG. 10A. However, embodiments are not limited to a specific arrangement order of the third sensing lines SL3-A, and the arrangement order of the third sensing lines SL3-A may be variously changed.

In each row, the sub-patterns $CP_{S1}$ to $CPS_{n-1}$ may be connected to each other through line patterns $LL_1$ to $LL_{n-1}$. For example, the sub-patterns $CP_{S1}$, which constitute the first row of the sub-patterns $CP_{S1}$ to $CPS_{n-1}$, may be connected to each other through a plurality of line patterns $LL_1$ to electrically connect the first line $SL2_1$ of the second sensing lines SL2 to the first line $SL3_1$ of the third sensing lines SL3-A. The sub-patterns $CP_{S2}$, which constitute the second row of the sub-patterns $CP_{S1}$ to $CPS_{n-1}$, may be connected to each other through a plurality of line patterns $LL_2$ to electrically connect the second line $SL2_2$ of the second sensing lines SL2 to the second line $SL3_2$ of the third sensing lines SL3-A. In addition, the sub-pattern $CPS_{n-1}$, which constitutes the (n−1)-th row of the sub-patterns $CP_{S1}$ to $CPS_{n-1}$, may be a single pattern. The sub-pattern $CPS_{n-1}$ constituting the (n−1)-th row may be connected to the (n−1)-th line $SL2_{n-1}$ of the second sensing lines SL2 through a single line pattern $LL_{n-1}$ and may be coupled to the (n−1)-th line $SL3_{n-1}$ of the third sensing lines SL3-A. The n-th line $SL2_n$ of the second sensing lines SL2 may be directly connected to the n-th line $SL3_n$ of the third sensing lines SL3-A. However, embodiments are not limited to this example or a specific embodiment, and in some exemplary embodiments, an additional sub-pattern may be further provided to connect the n-th line $SL2_n$ of the second sensing lines SL2 to the n-th line $SL3_n$ of the third sensing lines SL3-A.

According to some embodiments, the sub-patterns $CP_{S1}$ to $CPS_{n-1}$ may be disposed on a layer different from the second and third sensing lines SL2 and SL3-A or the line patterns $LL_1$ to $LL_{n-1}$. The sub-patterns $CP_{S1}$ to $CPS_{n-1}$ may be disposed in a region overlapped with the second sensing lines SL2 and thus, the second sensing lines SL2 may be stably connected to corresponding ones of the third sensing lines SL3-A, without interference by other third sensing lines SL3-A adjacent thereto. According to some embodiments, the bridge patterns $CP_{S1}$ to $CPs_{n-1}$ may be designed in various shapes, and embodiments are not limited to a specific shape or structure of the bridge patterns $CP_{S1}$ to $CPS_{n-1}$.

Figure 11A:
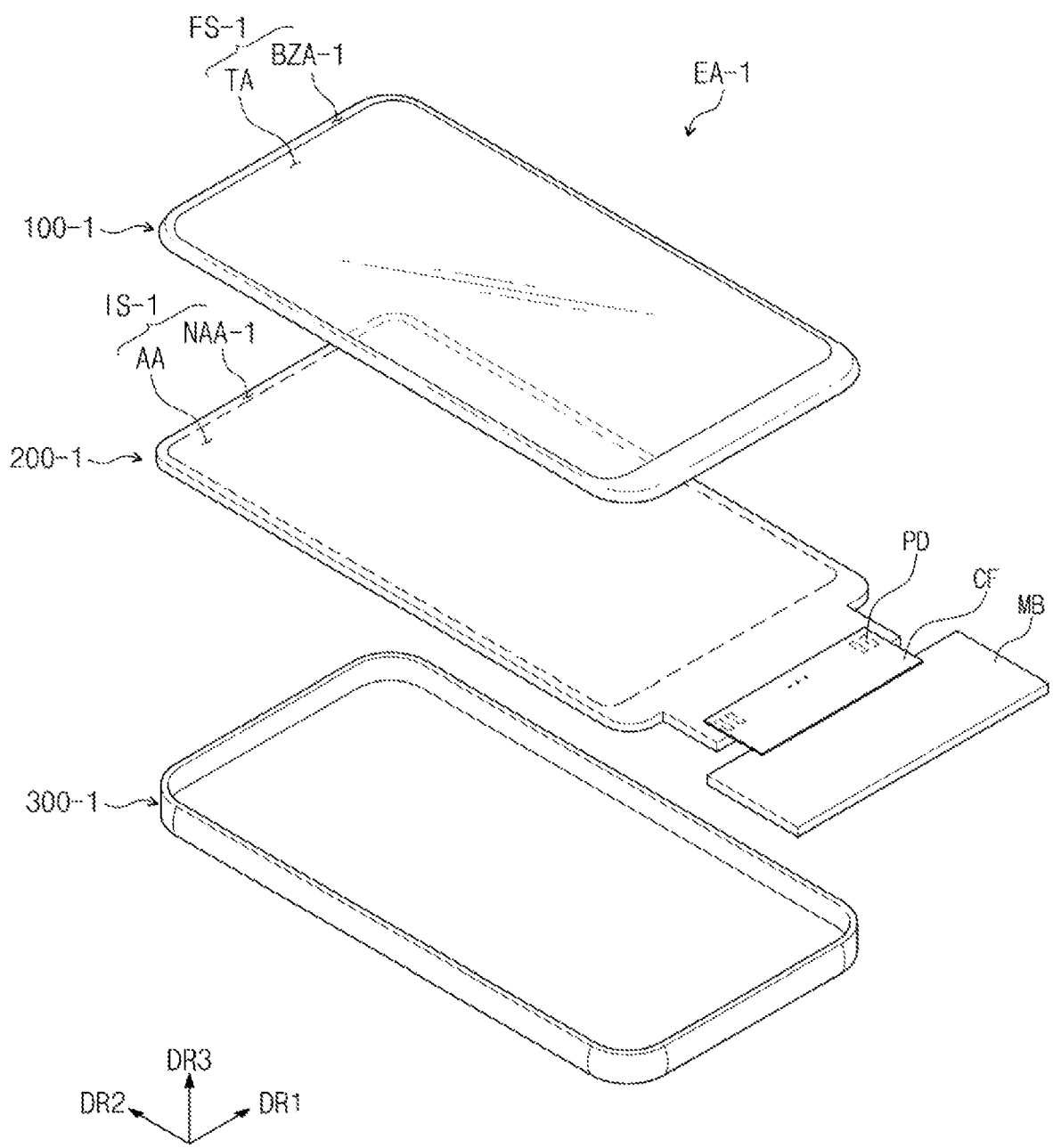
FIGS. 11A and 11B are exploded perspective views illustrating an electronic apparatus according to various exemplary embodiments.
Figure 11B:
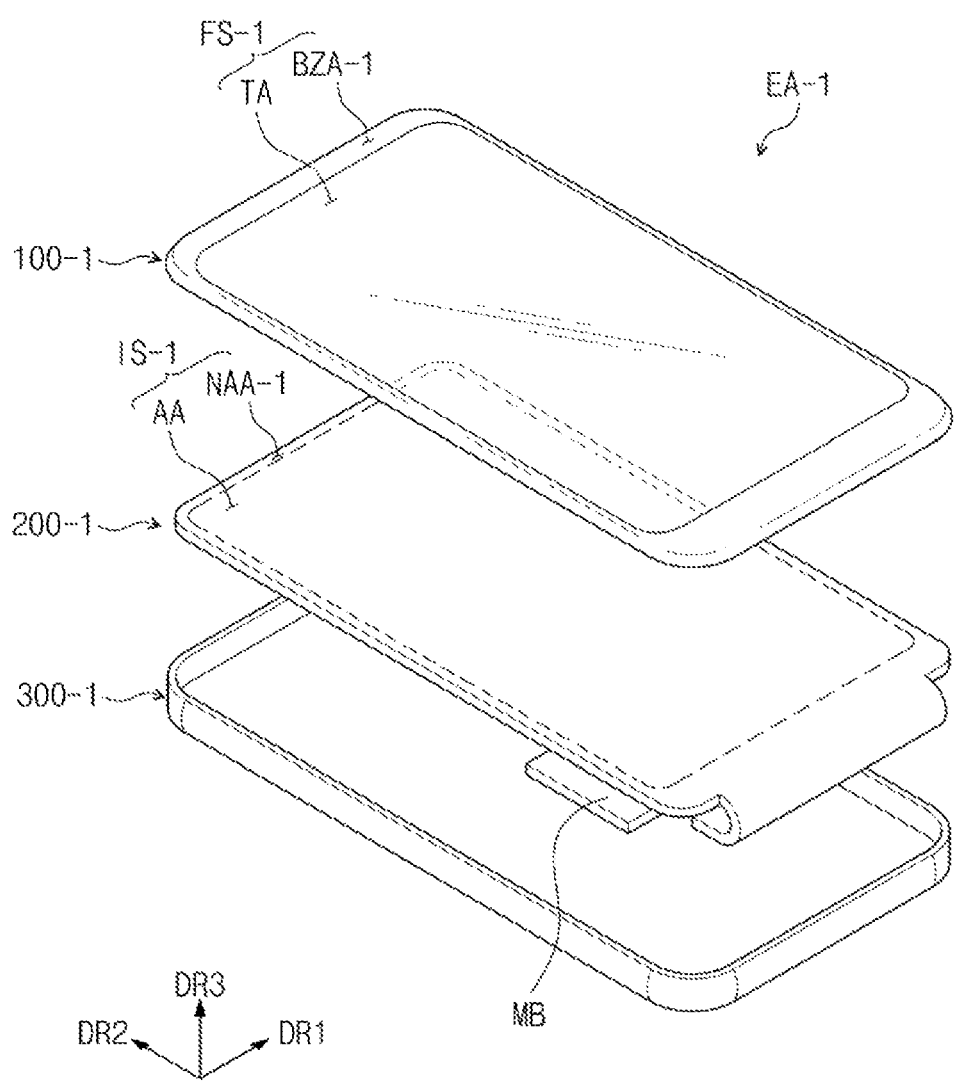
Figure 12A:
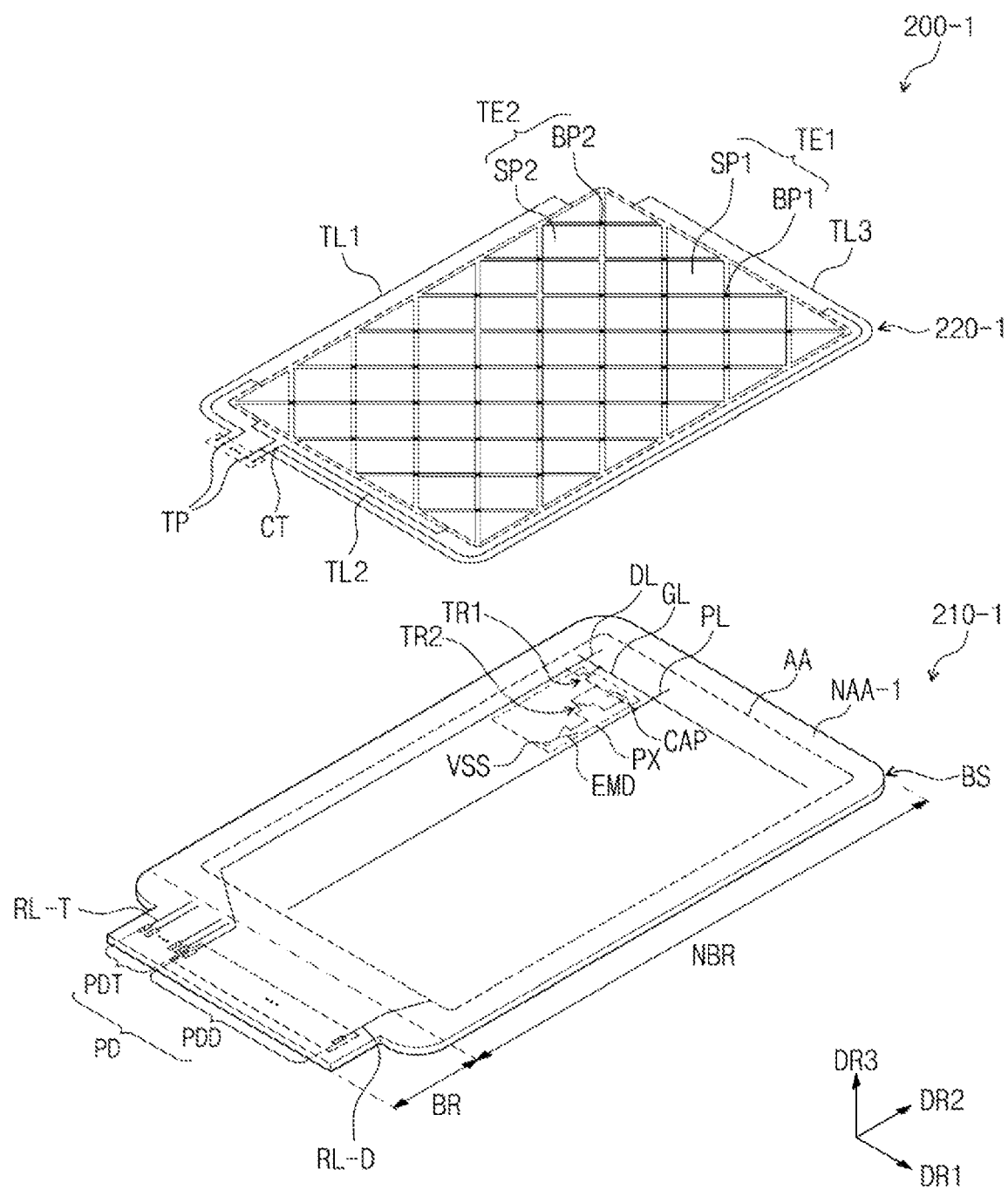
FIG. 12A is an exploded perspective view illustrating an electronic panel according to some exemplary embodiments.
Figure 12B:
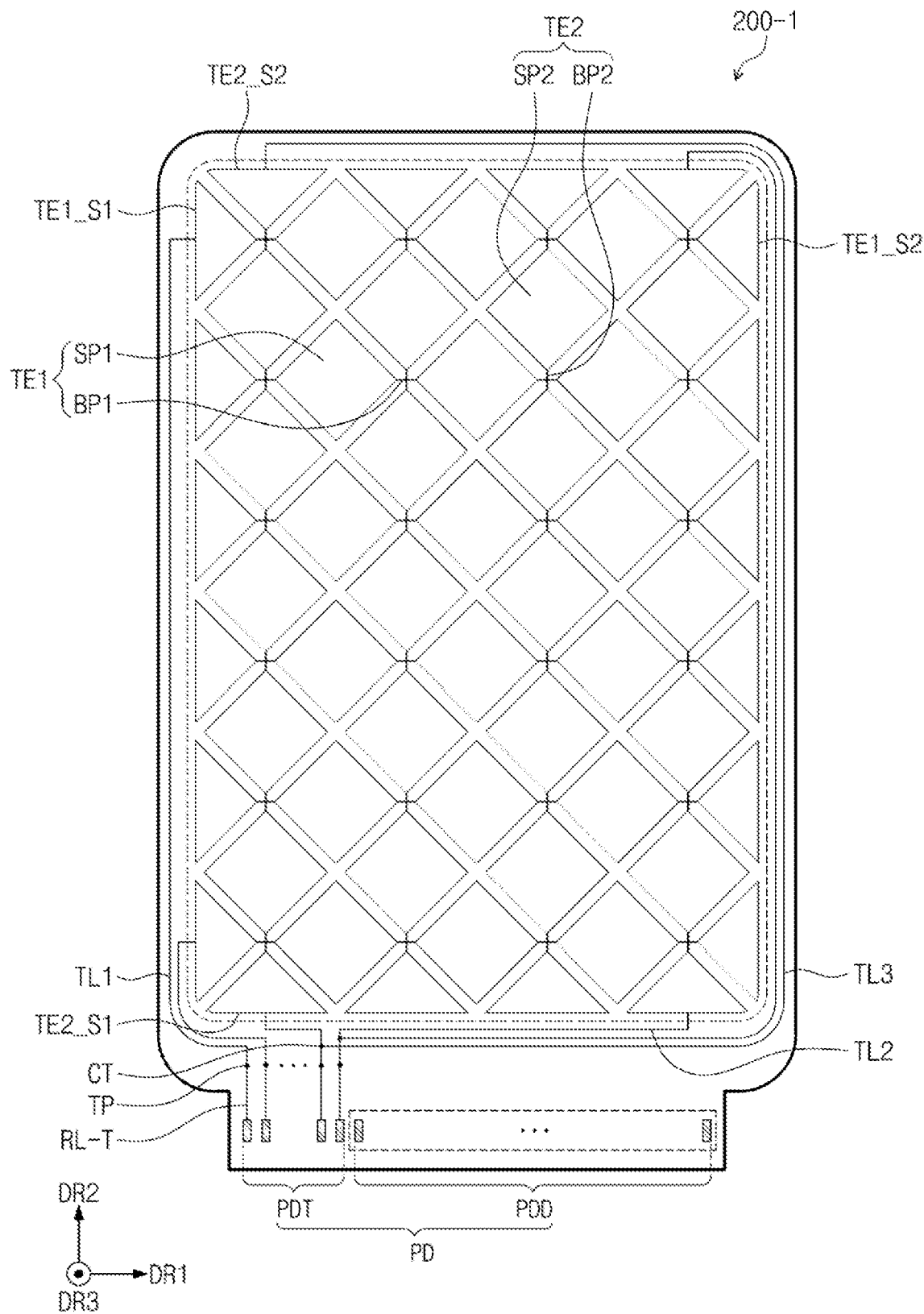
FIG. 12B is a plan view illustrating an electronic panel according to some exemplary embodiments.

FIGS. 11A and 11B are exploded perspective views illustrating an electronic apparatus according to various exemplary embodiments. FIG. 12A is an exploded perspective view illustrating an electronic panel according to some exemplary embodiments. FIG. 12B is a plan view illustrating an electronic panel according to some exemplary embodiments. FIGS. 11A and 11B illustrate exploded perspective views, which are presented to describe a bendable structure of an electronic panel 200-1. Hereinafter, some exemplary embodiments will be described with reference to FIGS. 11A to 12B.

As shown in FIG. 11A, an electronic apparatus EA-1 may include a window 100-1, an electronic panel 200-1, and an outer case 300-1. The window 100-1 and the outer case 300-1 may correspond to the window 100 and the outer case 300 as respectively described above, and thus, an overlapping description thereof will be omitted.

The electronic panel 200-1 may include a flexible or bendable portion. For example, the electronic panel 200-1 may include a non-bending portion NBR and a bending portion BR. The electronic panel 200-1 in an exemplary non-bent state is illustrated in FIG. 11A, and the electronic panel 200-1 in an exemplary bent state is illustrated in FIG. 11B.

The bending portion BR may be bent along a bending axis extending in the first direction DR1. The bending axis may be defined on the rear surface of the electronic panel 200-1.

Since the bending portion BR is bent to enclose the bending axis, an area of the peripheral region NAA-1 of the front surface IS-1 of the electronic panel 200-1 as seen from the front surface FS-1 of the window 100-1 may be reduced in the structure of FIG. 11B than in the structure of FIG. 11A. Accordingly, the bezel region BZA-1 may be reduced to improve the aesthetic quality of the electronic apparatus EA-1. However, embodiments are not limited to this example, and in some embodiments, the bending portion BR may be omitted from the electronic panel 200-1.

In some embodiments, the electronic panel 200-1 may include a plurality of pads PD disposed in (or on) the bending portion BR. The electronic apparatus EA-1 may further include the flexible circuit board CF, which is connected to the pads PD, and a main board MB connected to the flexible circuit board CF. If the electronic panel 200-1 is bent, the flexible circuit board CF and the main board MB may be placed on the rear surface of the electronic panel 200-1 and may not be seen through the front surface FS-1 of the window 100-1. Accordingly, the bezel region BZA-1 may be reduced, and thus, the aesthetic quality of the electronic apparatus EA-1 may be improved.

The flexible circuit board CF may include an insulating film and conductive lines mounted on the insulating film. The conductive lines may be coupled to the pads PD to electrically connect the electronic panel 200-1 to the main board MB. In some embodiments, the flexible circuit board CF may be omitted, and in this case, the main board MB may be directly coupled to the electronic panel 200-1.

The main board MB may include signal lines and electronic devices. The electronic devices may be coupled to the signal lines and may be electrically connected to the electronic panel 200-1. The electronic devices may generate various electrical signals (e.g., for generating the image IM of FIG. 1A or for sensing the user's input TC of FIG. 1A) or may process sensed signals. In an embodiment, the main board MB may include a plurality of electronic components for all signals, which will be generated or processed, but is embodiments are not limited to this example or a specific embodiment.

Referring to FIGS. 12A and 12B, the bending portion BR and the non-bending portion NBR may be substantially defined in a base substrate BS of a display unit 210-1. The base substrate BS may be bent by an external force. For example, the base substrate BS may have a flexible property. The base substrate BS may be provided in the form of, for example, a resin film (e.g., a polyimide (PI) film). In some embodiments, the base substrate BS may be formed of a plurality of films, such as a plurality of resin films. At least two of the resin films may be made materials different from one another.

The display unit 210-1 may include a plurality of signal lines GL, DL, and PL, a plurality of pixels PX, and a plurality of pads PD, which are disposed on the base substrate BS. The signal lines GL, DL, and PL and the pixels PX may be configured to have substantially the same features as previously described, and thus, an overlapping description will be omitted.

The pads PD may include display pads PDD and sensing pads PDT. Each of the display pads PDD may be connected to a corresponding signal line of the signal lines GL, DL, and PL through a first routing line RL-D. The display pads PDD may be coupled to the flexible circuit board CF to deliver electrical signals, which are received from the main board MB, to corresponding ones of the signal lines GL, DL, and PL.

The sensing pads PDT may be spaced apart from the display pads PDD in the first direction DR1. The sensing pads PDT may receive electrical signals, which are used for an input-sensing unit 220-1, from the main board MB or may deliver electrical signals, which are produced by the input-sensing unit 220-1, to the main board MB. The sensing pads PDT may be electrically connected to the input-sensing unit 220-1 through second routing lines RL-T.

The input-sensing unit 220-1 may be disposed on the display unit 210-1. The input-sensing unit 220-1 may include a plurality of first sensing electrodes TE1, a plurality of second sensing electrodes TE2, a plurality of first sensing lines TL1, a plurality of second sensing lines TL2, and a plurality of third sensing lines TL3.

Each of the first sensing electrodes TE1 may include a plurality of the first sensing patterns SP1 and a plurality of the first connection patterns BP1, and each of the second sensing electrodes TE2 may include a plurality of the second sensing patterns SP2 and a plurality of the second connection patterns BP2. The first sensing electrodes TE1 and the second sensing electrodes TE2 may be configured to have substantially the same features as those of the first sensing electrodes SE1 and the second sensing electrodes SE2 previously described, and thus, an overlapping description will be omitted.

The first sensing lines TL1 may be connected to first ends TE1_S1 of the first sensing electrodes TE1 that oppose second ends TE1 S2 of the first sensing electrodes TE1, respectively. The second sensing lines TL2 may be connected to first ends TE2_S1 of the second sensing electrodes TE2, respectively. In some embodiments, the first and second sensing lines TL1 and TL2 may be connected to the second routing lines RL-T, respectively, through terminal portions TP.

The terminal portions TP may connect the first and second sensing lines TL1 and TL2 to the second routing lines RL-T of the display unit 210-1. The terminal portions TP may be conductive patterns in direct contact with the second routing lines RL-T, or conductive patterns that penetrate an insulating layer and are coupled to the second routing lines RL-T. According to some embodiments, since the input-sensing unit 220-1 further includes the terminal portions TP, the input-sensing unit 220-1 may be easily connected to the sensing pads PDT through the second routing lines RL-T, which are disposed in (or as part of) the display unit 210-1.

The third sensing lines TL3 may be connected to second ends TE2_S2 of the second sensing electrodes TE2. The third sensing lines TL3 may be respectively connected to the second sensing lines TL2 through the coupling portions CT. Accordingly, the third sensing lines TL3 may receive the same electrical signals as those of the second sensing lines TL2 from the sensing pads PDT connected through the terminal portions TP.

According to some exemplary embodiments, the sensing pads PDT and the display pads PDD may be provided in (or on) a single substrate (e.g., the base substrate BS). Thus, the sensing pads PDT and the display pads PDD may be connected to the main board MB through a single flexible circuit board CF, and this may make it possible to simplify a process of manufacturing and assembling the electronic apparatus EA-1.

According to some exemplary embodiments, the second sensing lines TL2 and the third sensing lines TL3 may receive electrical signals through the same sensing pads PDT. As such, even when additional sensing pads PDT are not added for the third sensing lines TL3, the input-sensing unit 220-1 may be configured to realize uniform sensitivity throughout the entire top surface of the active region AA.

According to some exemplary embodiments, it may be possible to provide an input-sensing unit, whose signal line density and reliability are improved, and an electronic apparatus including the same. In addition, it may be possible to prevent the number of pads in the input-sensing unit from being increased, and thereby, to more efficiently and effectively manufacture and assemble an electronic apparatus.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. An input-sensing unit, comprising:
   first sensing electrodes;
   second sensing electrodes electrically insulated from the first sensing electrodes;
   first sensing lines respectively connected to the first sensing electrodes;
   second sensing lines respectively connected to first ends of the second sensing electrodes;
   third sensing lines respectively connected to second ends of the second sensing electrodes, the second ends opposing the first ends; and
   bridge patterns respectively connecting the second sensing lines to the third sensing lines,
   wherein:
   in a plan view, the bridge patterns are spaced apart from the first sensing electrodes and the second sensing electrodes,
   each of the bridge patterns comprises a transparent conductive oxide,
   a distance between each of the third sensing lines and an adjacent second sensing line closest thereto is greater than or equal to 10 μm.

2. The input-sensing unit of claim 1, wherein the bridge patterns extend in a direction crossing the second sensing lines.

3. The input-sensing unit of claim 2, wherein the bridge patterns are disposed on at least some of the second sensing lines.

4. The input-sensing unit of claim 1, wherein the first sensing lines and the second sensing lines are disposed on a same layer as the third sensing lines.

5. The input-sensing unit of claim 4, wherein:
   each of the first sensing electrodes comprises:
   first sensing patterns; and
   first connection patterns disposed between and connecting adjacent first sensing patterns among the first sensing patterns;
   each of the second sensing electrodes comprises:
   second connection patterns disposed on a different layer than the first connection patterns; and
   second sensing patterns connected to the second connection patterns;
   the bridge patterns are disposed on a same layer as a layer on which one of the first connection patterns and the second connection patterns is disposed; and
   the third sensing lines are disposed on a same layer as a layer on which the other of the first connection patterns and the second connection patterns is disposed.

6. The input-sensing unit of claim 1, further comprising:
   first pads respectively connected to the first sensing lines; and
   second pads respectively connected to the second sensing lines,
   wherein, in a plan view, the second pads are spaced apart from the third sensing lines.

7. The input-sensing unit of claim 6, wherein each of the bridge patterns extends in a direction parallel to an arrangement direction of the first pads and the second pads.

8. The input-sensing unit of claim 1, wherein the bridge patterns have a same shape as one another.

9. The input-sensing unit of claim 8, wherein each of the bridge patterns electrically connected to each of the second sensing lines, and
   in a plan view, each of the bridge patterns overlaps with all of the second sensing lines.

10. The input-sensing unit of claim 1, wherein, in a plan view, each of the bridge patterns overlaps a different number of the second sensing lines.

11. The input-sensing unit of claim 1, wherein each of the third sensing lines comprises metal.

12. An electronic apparatus, comprising:
   a display unit comprising a base substrate, and pixels disposed on the base substrate; and
   an input-sensing unit disposed on the display unit, the input-sensing unit comprising:
   sensing electrodes;
   first sensing lines respectively connected to first ends of the sensing electrodes;
   second sensing lines respectively connected to second ends of the sensing electrodes, the second ends opposing the first ends; and
   bridge patterns crossing at least some of the first sensing lines and respectively connecting the first sensing lines to the second sensing lines, wherein:
in a plan view, the bridge patterns are spaced apart from the sensing electrodes,
each of the bridge patterns comprises a transparent conductive oxide,
a distance between each of the first sensing lines and an adjacent second sensing line closest thereto is greater than or equal to 10 μm.

13. The electronic apparatus of claim 12, wherein, in a plan view, the bridge patterns overlap with the first sensing lines.

14. The electronic apparatus of claim 13, wherein each of the bridge patterns extends in a direction parallel to an extension direction of each of the second sensing lines.

15. The electronic apparatus of claim 12, wherein:
each of the second sensing lines comprises metal.

16. The electronic apparatus of claim 12, further comprising:
sensing pads respectively connected to the first sensing lines,
wherein, in a plan view, the sensing pads are spaced apart from the second sensing lines.

17. The electronic apparatus of claim 16, wherein the sensing pads are disposed on the base substrate.

18. The electronic apparatus of claim 16, wherein the sensing pads are disposed on the display unit.

19. The electronic apparatus of claim 12, wherein each of the bridge patterns extends in a direction parallel to the second sensing lines.

* * * * *